(12) United States Patent
Singh et al.

(10) Patent No.: US 9,050,864 B2
(45) Date of Patent: Jun. 9, 2015

(54) TIRE WEAR STATE ESTIMATION SYSTEM AND METHOD

(71) Applicants: Kanwar Bharat Singh, Stow, OH (US); Anthony William Parsons, Domeldange (LU)

(72) Inventors: Kanwar Bharat Singh, Stow, OH (US); Anthony William Parsons, Domeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 40 days.

(21) Appl. No.: 13/917,691

(22) Filed: Jun. 14, 2013

(65) Prior Publication Data

US 2014/0366618 A1 Dec. 18, 2014

(51) Int. Cl.
*B60C 11/24* (2006.01)
*B60C 23/04* (2006.01)
*G01M 17/02* (2006.01)
*B60C 23/06* (2006.01)

(52) U.S. Cl.
CPC ............. *B60C 23/04* (2013.01); *G01M 17/02* (2013.01); *B60C 11/246* (2013.04); *B60C 11/24* (2013.01); *B60C 23/0408* (2013.01); *B60C 23/0488* (2013.01); *B60C 23/064* (2013.01)

(58) Field of Classification Search
CPC .. B60C 11/246; B60C 2019/004; B60C 11/24
USPC .............................................. 73/146.3, 146.5
See application file for complete search history.

(56) References Cited

U.S. PATENT DOCUMENTS

| | | | |
|---|---|---|---|
| 7,546,764 B2 | 6/2009 | Morinaga et al. | 73/146 |
| 7,552,628 B2 | 6/2009 | Mancosu et al. | 73/146 |
| 2005/0072223 A1* | 4/2005 | Fennel et al. | 73/146.2 |
| 2005/0085987 A1* | 4/2005 | Yokota et al. | 701/80 |
| 2005/0150283 A1* | 7/2005 | Shick et al. | 73/146 |
| 2008/0103659 A1 | 5/2008 | Mancosu et al. | 701/41 |
| 2009/0055040 A1 | 2/2009 | Nagaya | 701/29 |
| 2011/0060500 A1* | 3/2011 | Irth et al. | 701/36 |
| 2011/0199201 A1 | 8/2011 | Brusarosco et al. | 340/438 |
| 2013/0211621 A1* | 8/2013 | Breuer et al. | 701/1 |

FOREIGN PATENT DOCUMENTS

| | | | |
|---|---|---|---|
| DE | 19716586 | 8/1998 | G01B 21/18 |
| EP | 2172760 | 4/2010 | G01M 17/02 |
| EP | 2301769 | 3/2011 | B60C 11/24 |
| WO | 2011/054363 | 5/2011 | B60G 17/0165 |

OTHER PUBLICATIONS

European Search Report received by Applicant Oct. 22, 2014.

\* cited by examiner

*Primary Examiner* — Lisa Caputo
*Assistant Examiner* — Jamel Williams
(74) *Attorney, Agent, or Firm* — Richard B. O'Planick

(57) ABSTRACT

The invention relates generally to tire monitoring systems for collecting measured tire parameter data during vehicle operation and, more particularly, to a system and method for estimating tire wear state based upon such measurements.

15 Claims, 27 Drawing Sheets

TIRE WEAR STATE ESTIMATION SYSTEM AND METHOD

FIELD OF THE INVENTION

The invention relates generally to tire monitoring systems for collecting measured tire parameter data during vehicle operation and, more particularly, to a system and method for estimating tire wear state based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire wear state are important considerations for vehicle operation and safety. It is accordingly further desirable to measure tire wear state and communicate wear state to vehicle systems such as braking and stability control systems in conjunction with the measured tire parameters of pressure and temperature.

SUMMARY OF THE INVENTION

According to one aspect of the invention, a tire wear state estimation system includes a tire pressure measuring device affixed to a vehicle tire for measuring tire inflation pressure and generating tire inflation pressure data; tire vertical mode measuring means for measuring tire vertical mode frequency and generating tire vertical mode frequency data; and tire identification means for generating tire-specific frequency mode coefficients using tire-specific identification data. A tire wear estimation is made based upon the tire inflation pressure data, the vertical mode frequency data, and the tire-specific frequency mode coefficients.

In another aspect, the tire-mounted pressure measuring device is operative to measure a tire cavity pressure and transmit the tire inflation pressure data from the tire cavity pressure measurement and the tire-specific identification data is stored within and accessible from the tire-mounted pressure measuring device.

Pursuant to another aspect of the invention, the tire-specific frequency mode coefficients are generated by either using on-vehicle or in-tire measurement of a tire vertical mode frequency, effected respectively from either a wheel-mounted accelerometer or a tire crown-mounted accelerometer.

The tire wear state estimation system, in another aspect, uses a correlation model between the tire wear state and the tire vertical mode frequency wherein the correlation model employs a recursive least squares algorithm based on a polynomial model capturing a dependency between a wear state of the tire, the tire inflation pressure data, and the tire vertical mode frequency.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for Mean square error, the error between and a measured signal and an estimated signal which the Kalman Filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is Power Spectral Density (a technical name synonymous with FFT (Fast Fourier Transform)).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
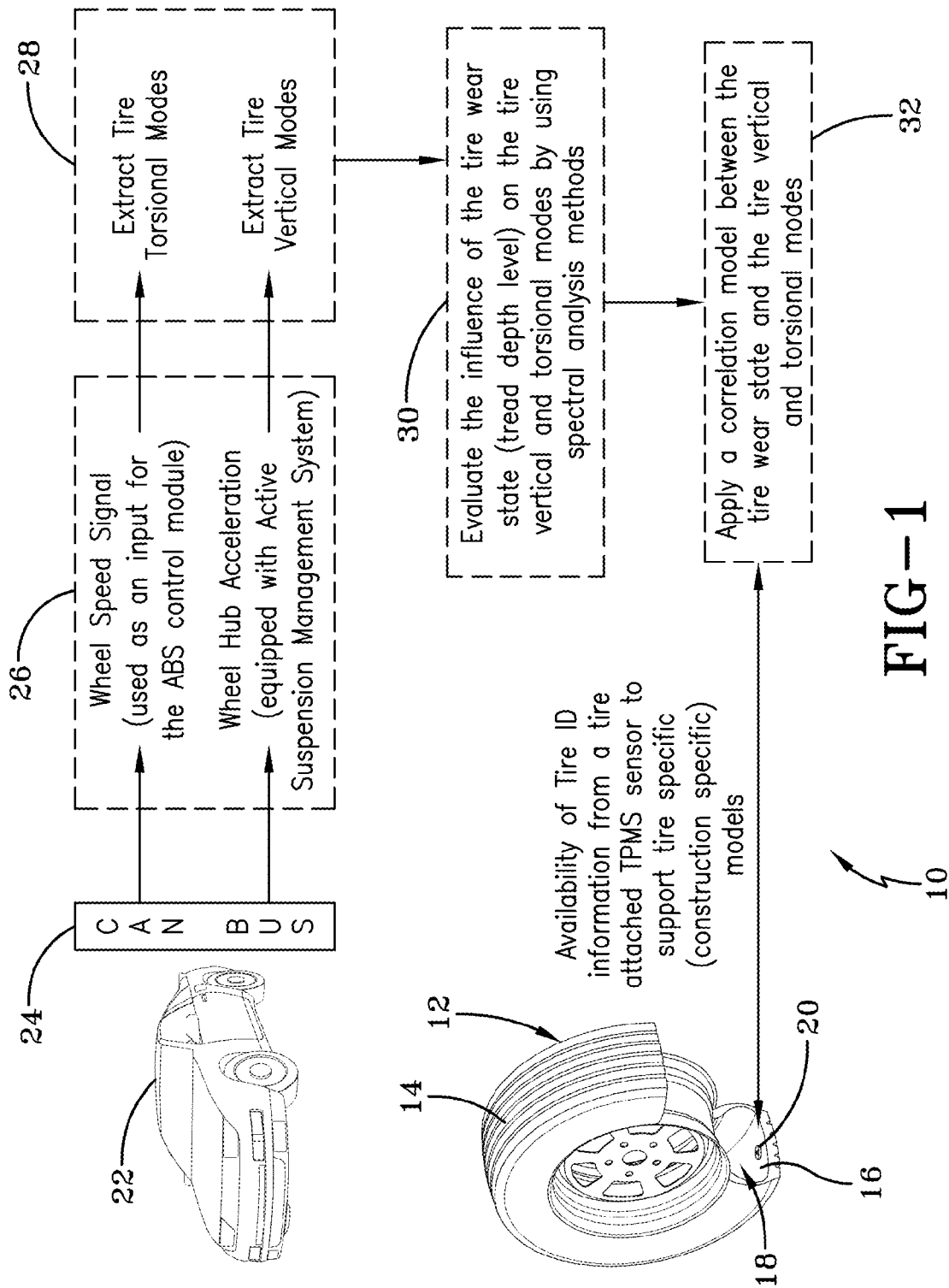
FIG. 1 is a tread wear state estimation system schematic diagram.

Referring to FIG. 1, a tire tread wear estimation system 10 is shown based on spectral analysis of the tire vertical vibration signal. Such a system is useful in advising a vehicle owner on when to change tires and may be used to provide a driver with information on the interrelation between the state of tire tread wear and other factors such as road condition. Tire properties generally change as a function of tire wear. Accordingly, an estimate of tire tread wear level may be used as one input for tire state estimation.

Tires (a representative one) 12 mounted to a vehicle 22 include ground-engaging tread regions 14 that wear over time. The tires 12 enclose a tire cavity 18 by means of a tire innerliner 16. A tire pressure monitoring system module (TPMS) 20 may be affixed to the tire innerliner 16. The module 20 stores tire ID information from which tire specific construction data may be identified.

The system 10 employs a tire wear state estimation algorithm uses signals 26 available on a CAN bus (controller area network) 24 of vehicle 22. The signals may include wheel speed signals, useful as an input for an ABS (anti-lock braking system) and/or a wheel hub acceleration signal, on vehicles equipped with an active suspension management system. From the wheel speed signal, mode extractions 28 are made, extracting torsional modes, and from the wheel hub acceleration signal, extracting tire vertical modes. An evaluation 30 is then conducted of the tire vertical modes to correlate the influence of the tire wear state (depth level of the tire tread 14) on the tire vertical mode by using spectral analysis methods. Application 32 of a correlation model is made between the tire wear state and the tire vertical mode using the tire specific models developed from TPMS-facilitated tire identification information.

Figure 2A:
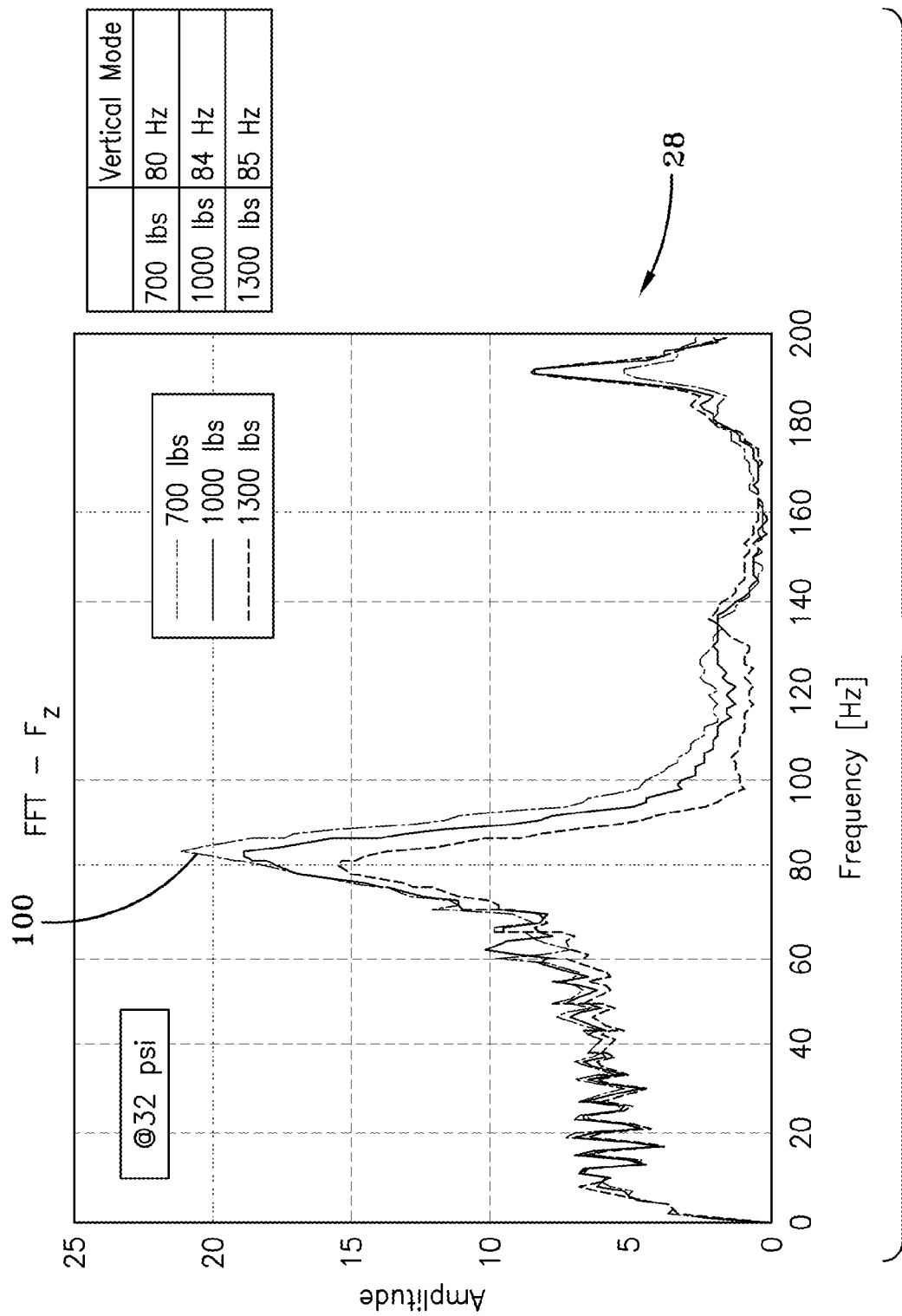
FIG. 2A is a frequency graph showing an amplitude vs. frequency comparison of the vertical mode at three loading levels and at a tire inflation pressure of 32 psi.

With reference to FIG. 2A, the tire vertical vibration mode FFT-FZ of a vibrating tire is examined. Experimental results are illustrated graphically in graph 28 of amplitude vs. frequency (Hz) of the vibrating tire having an inflation of 32 psi for three loadings: 700, 1000 and 1,300 pounds. A wheel hop mode exits around 10 Hz (not shown in the graph) as the rim and the belt rotating the experimental tire move up and down together. The next vertical mode, the tire vertical mode, exists around 80 Hz as illustrated by peak 100; in this vertical belt mode the belt moves up and down but the rim does not move as much. The tire vertical tire vertical mode detected experimentally at the three loadings is shown in the associated table of FIG. 2A; for 700 pounds a vertical mode at 80 Hz; for 1000 pounds a vertical mode at 84 Hz., and for 1300 pounds a vertical load at 85 Hz. The wheel hop vertical mode depends mainly on suspension spring properties supporting the test wheel and tire and the overall tire stiffness.

Figure 2B:
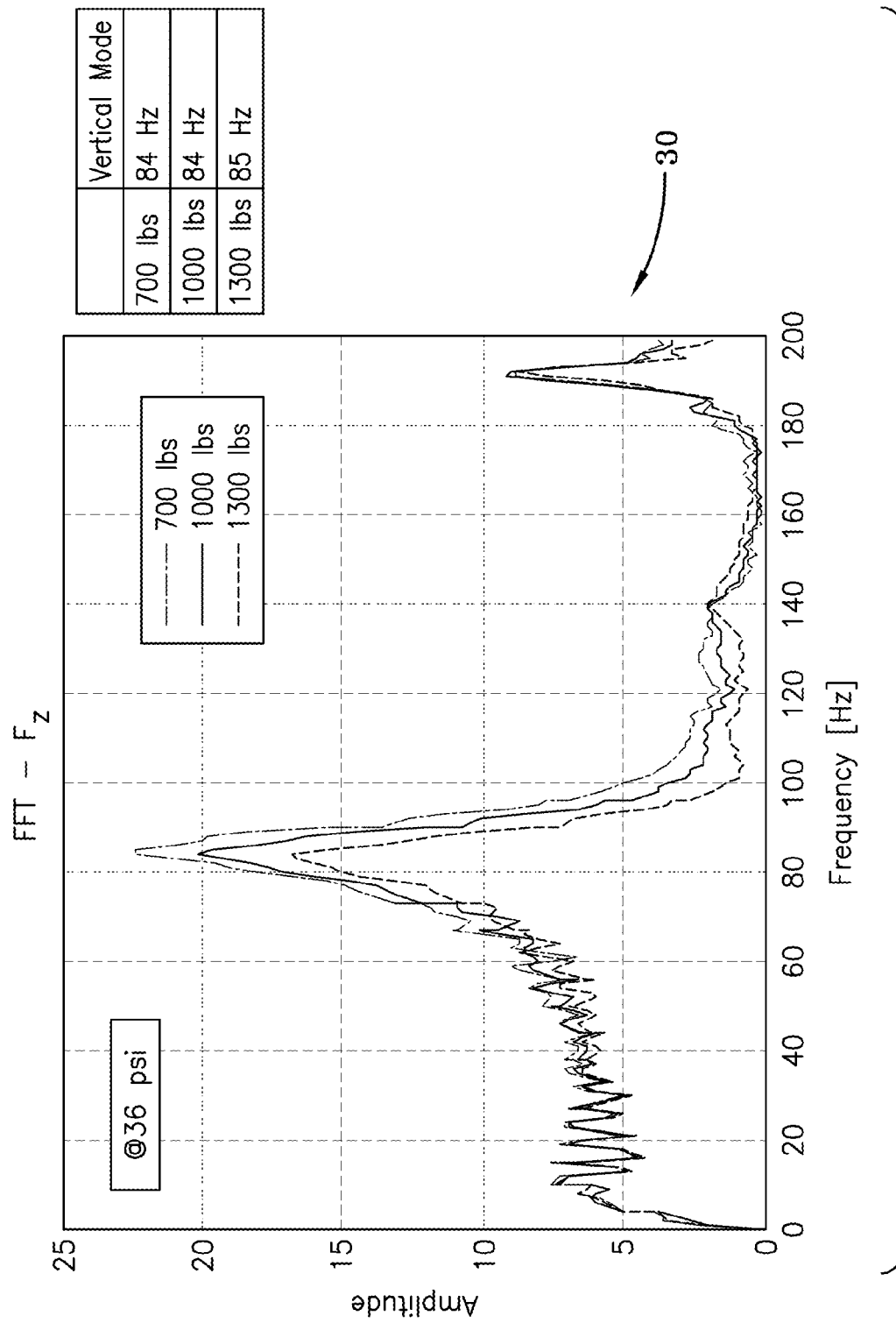
FIG. 2B is a frequency graph showing amplitude vs. frequency comparison of the vertical mode of a tire inflated to 36 psi at three loading levels.
Figure 2C:
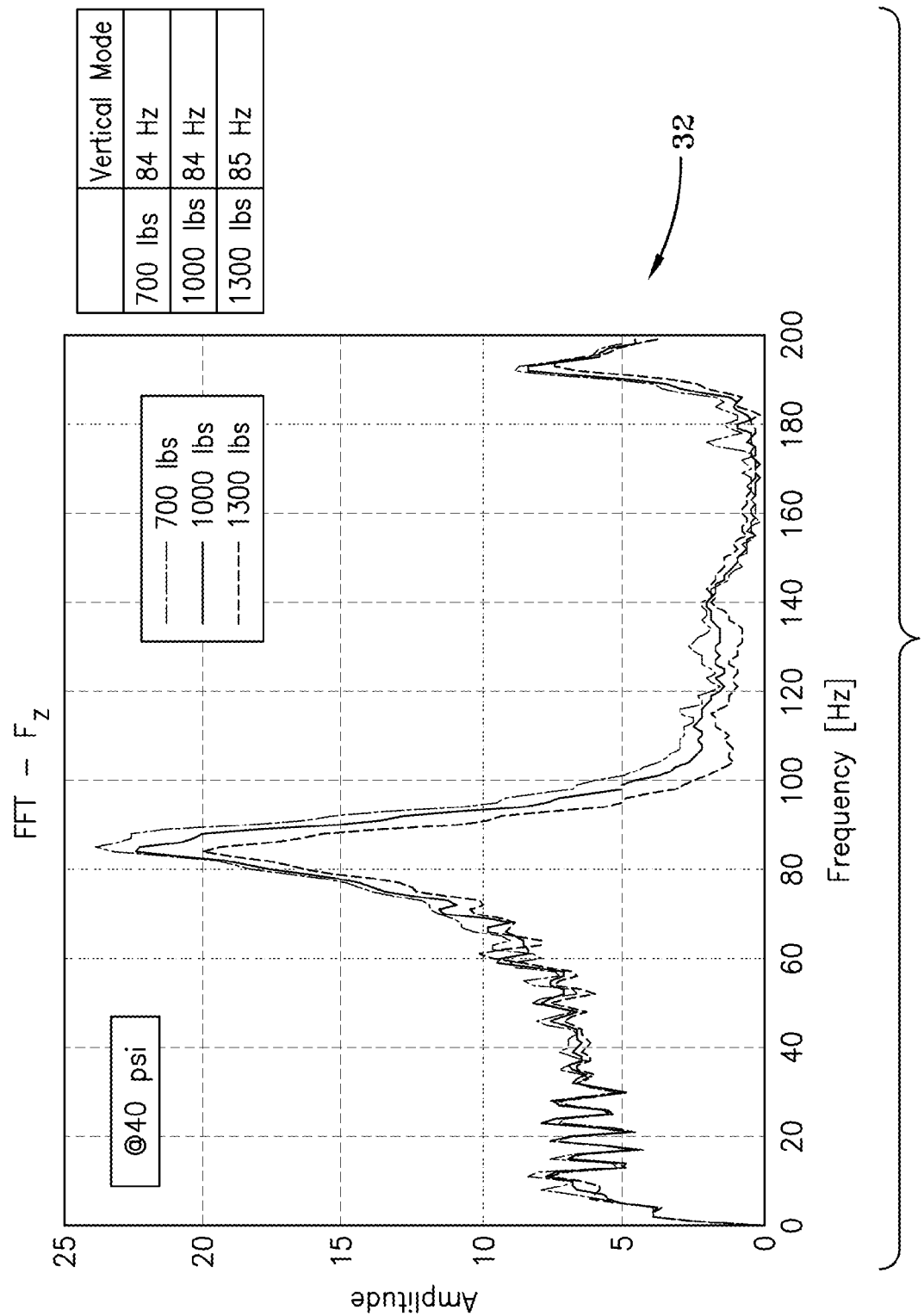
FIG. 2C is a frequency vs. amplitude graph showing the vertical mode of a tire inflated to 40 psi at the referenced three loading levels.

FIGS. 2B and 2C respectively show for comparison purposes a testing of a rotating suspended tire and wheel assembly by graphs 30, 32 for tire inflations of 36 and 40 psi respectively. For the tire vertical mode, the following equation holds:

Vertical mode frequency ω=square root of $k/m$ where "k" is the tire carcass, inflation pressure dependent and m is the mass of the tire belt and tread mass. The dependence of tire wear (reduction in mass of the tread) and tire vertical mode of a rotating tire forms the basis for a correlation model between the tire wear state and the tire vertical mode frequency.

Apart from tire inflation pressure and tread mass, other factors were determined which influence tire vertical mode frequency. Those other factors include tire load, rolling speed and road roughness level (smooth versus rough or very rough). Inflation pressure affects the vertical stiffness of a tire; tread depth affects belt mass (m); vertical load affects impact force; rotational velocity affects impact force and stiffness; and road roughness affects input excitation. The graphs 34, 36, 38, 40 shown respectively in FIGS. 3A, 3B, 4A, 4B show experimentally how different operating conditions influence the resonance frequencies of the tire. Cleated wheel tests were performed on a fixed spindle machine. Cleat inputs are known to introduce torsional and vertical excitations in a tire while the spindle machine controls tire load and rolling speed. The road roughness effects are captured by using cleats of different sizes and the inflation pressure was manually changed prior to each test. The wear dependencies were captured by using tires with different levels of non-skid depth.

A hub force measurement was made on a tire using the cleated wheel test and from the hub force measurement, tire vibration modes were determined by means of an FFT (Fast Fourier Transform) analysis. The FFT analysis, conventionally used as a signal processing tool, yields tire vibration modes including the vertical mode represented in the subject graphs. As used herein, FFT is an algorithmic tool which operates by decomposing an N point time domain signal into N time domain signals each composed of a single point. The second step is to calculate the N frequency spectra corresponding to these N time domain signals. Lastly, the N spectra are synthesized into a single frequency spectrum.

Figure 3B:
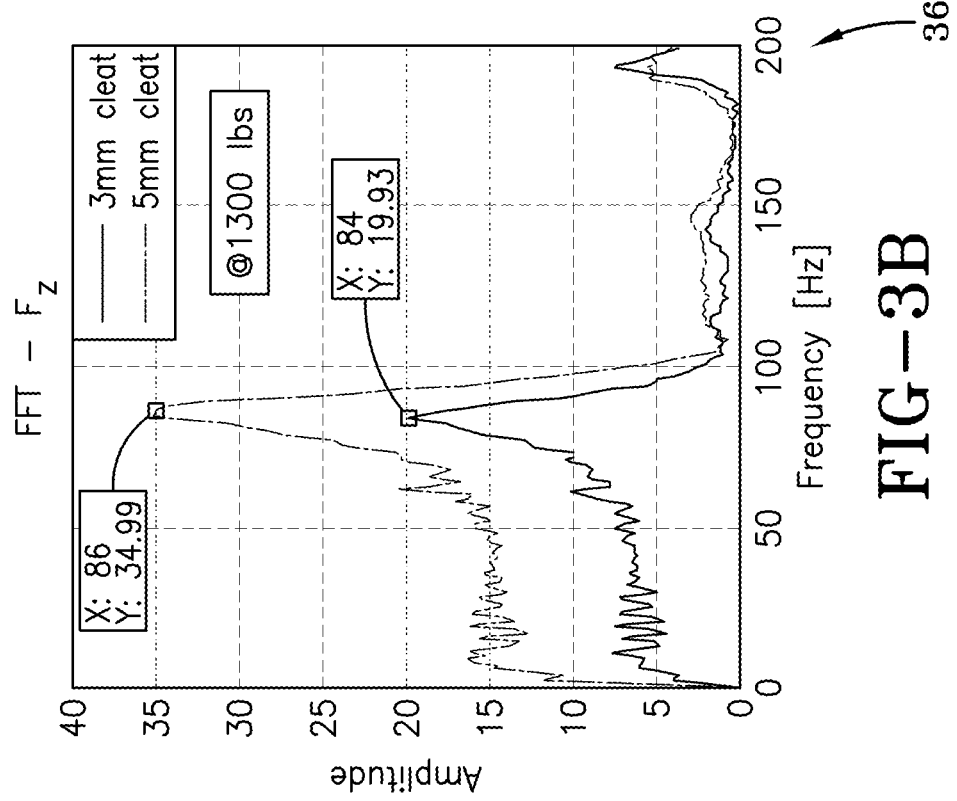
FIG. 3B is a frequency vs. amplitude graph showing the vertical mode at a tire loading of 1300 pounds on a tire comparing two tire cleat sizes.
Figure 3A:
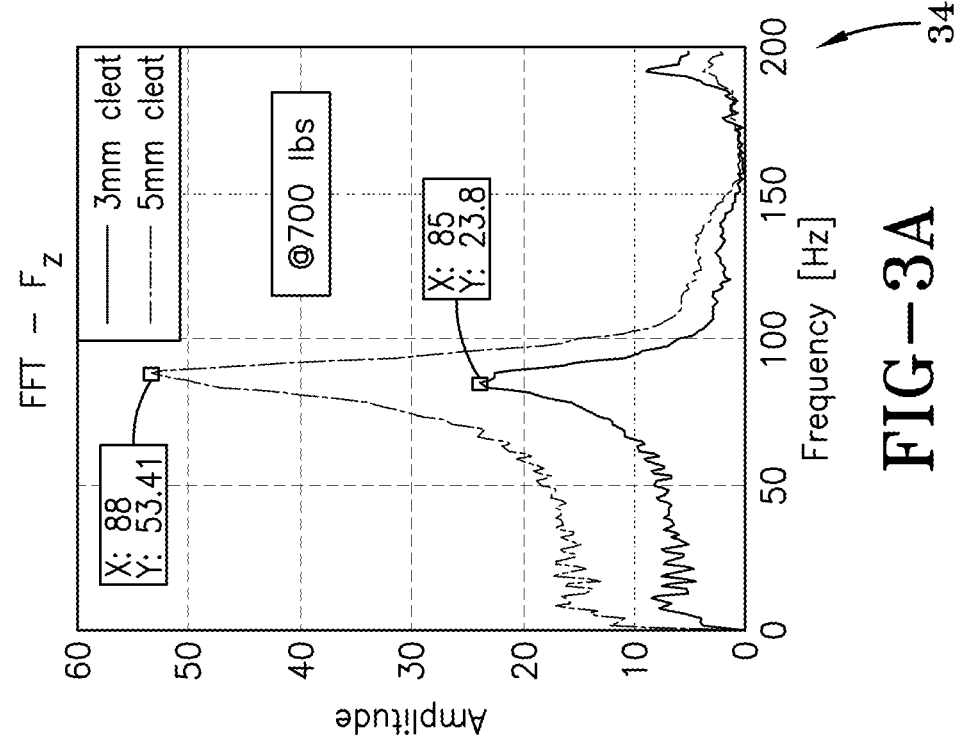
FIG. 3A is a frequency vs. amplitude graph showing the vertical mode at a tire loading of 700 pounds on a tire comparing two tire cleat sizes.

In FIG. 3A, cleats of 3 mm and 5 mm were used and the vertical mode FFT-Fz determined for a load of 700 pounds. In FIG. 3B, for the same two cleat sizes, the graph 36 at a tire loading of 1300 pounds is shown. As reflected in the graphs 34, 36, results indicated that a change in the tire loading condition influences the signal amplitude but changes in the signal spectral content (mode frequency) were relatively low.

Figure 4A:
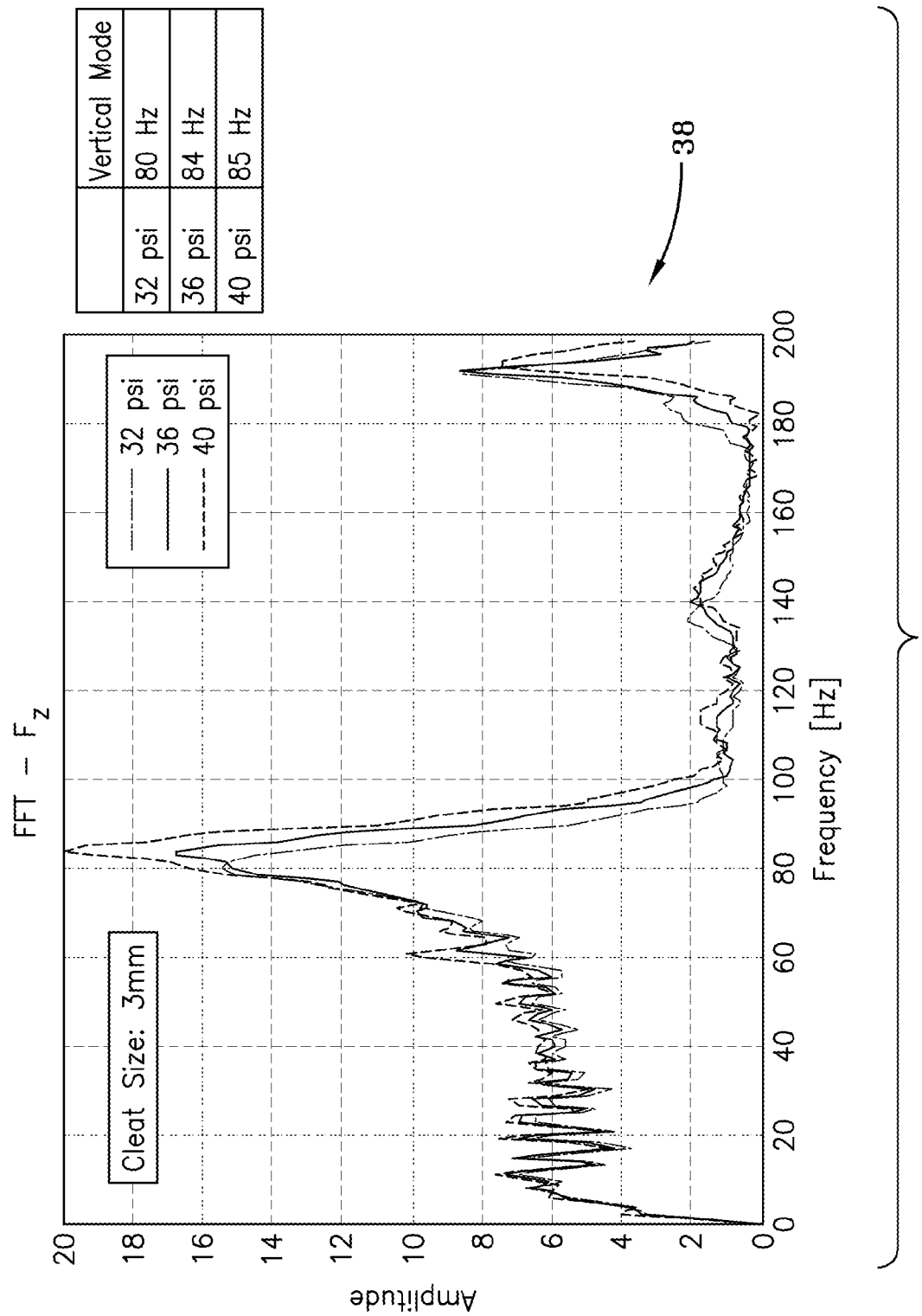
FIG. 4A is a summary frequency vs. vertical mode amplitude graph for a tire cleat of 3 mm size at three different tire loading levels.
Figure 4B:
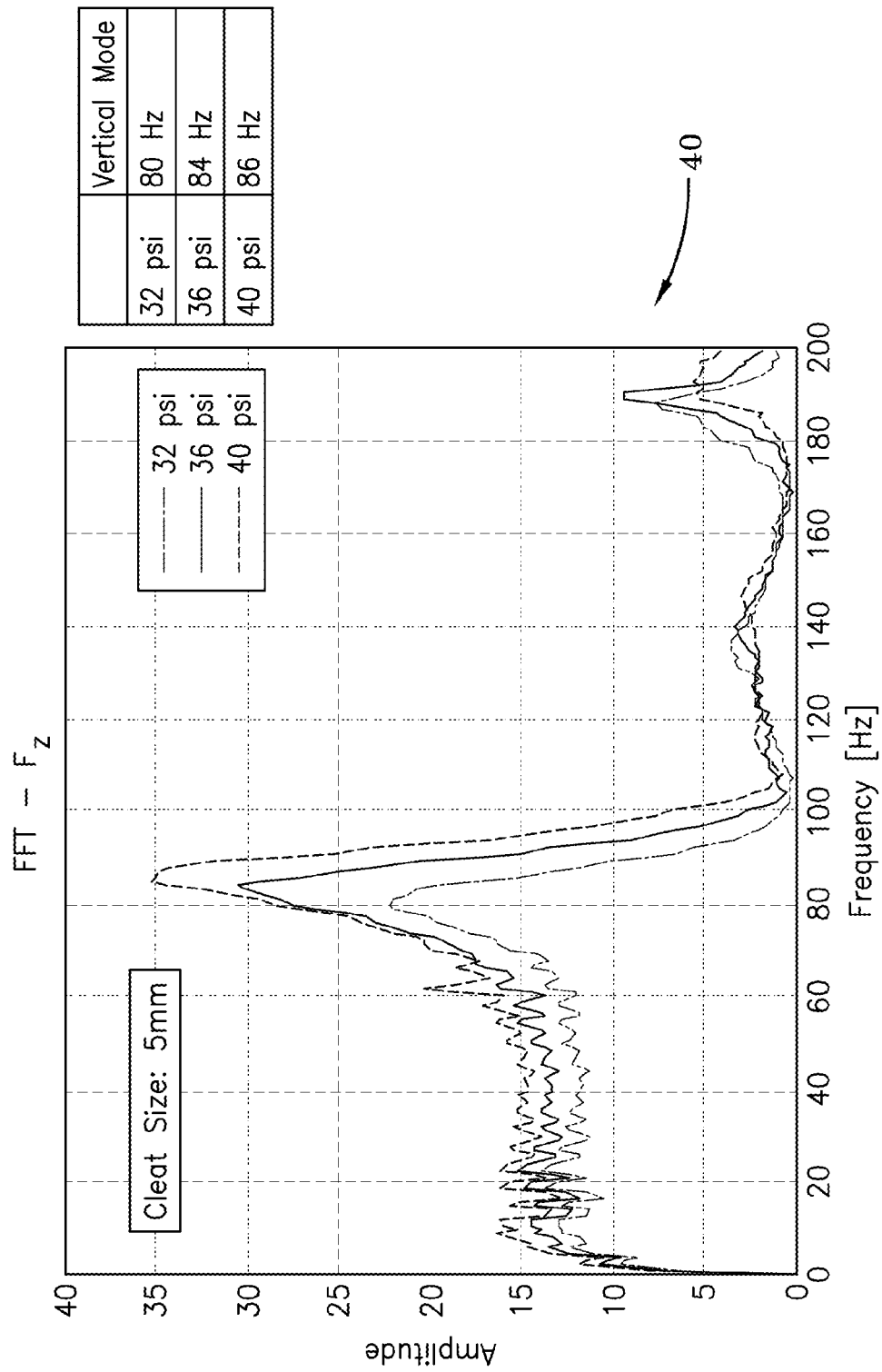
FIG. 4B is a summary frequency vs. vertical mode amplitude graph for a tire cleat of 5 mm size at three different tire loading levels.

Tire inflation dependencies were also tested as reflected in test results of FIGS. 4A and 4B. FIG. 4A shows the test results 38 for a tire on a cleated wheel with cleat size of 3 mm for inflation pressures of 32, 36, and 40 psi. The vertical modes at the tested inflation pressure were found to be, respectively 80, 84, and 85 Hz. The results indicate that changes in signal amplitude and its spectral content are moderately high as a result of tire inflation variance.

FIG. 4B shows test results of the tire under a range of loads on a wheel having cleats of 5 mm. The graph 40 summarizes speed dependency and shows that a change in the tire rolling speed influences the signal amplitude but changes in the signal spectral content are reasonably low. A more significant change in the spectral content at higher speeds can occur where the centrifugal stiffening effect on the tire becomes a dominant factor.

Figure 5:
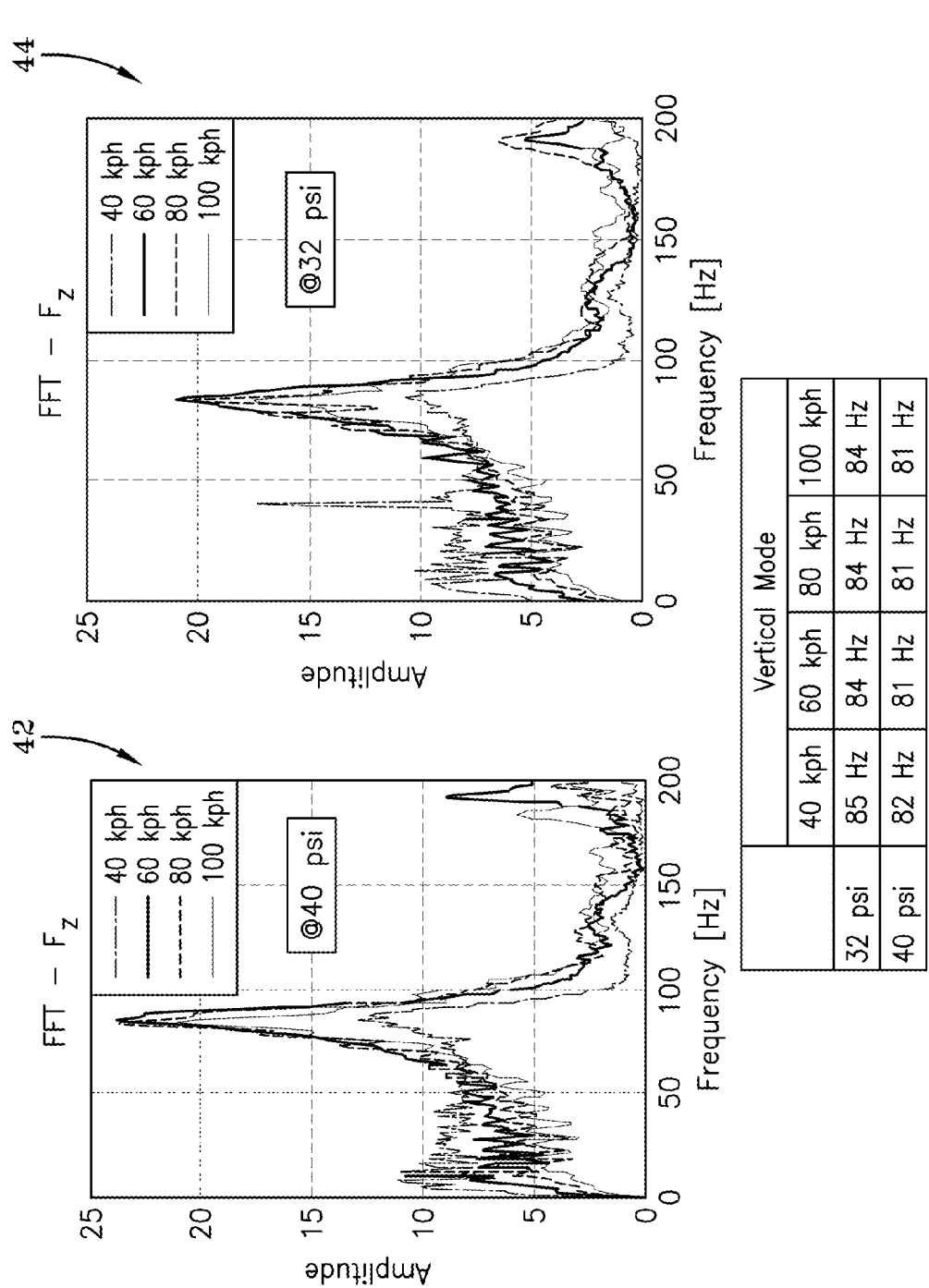
FIG. 5 is a set of graphs showing frequency vs. vertical mode amplitude for a tire inflated to 40 psi and 32 psi, comparing the experimental results attained at four different vehicle speeds.

FIG. 5 summarizes graphically with graphs 42, 44 and by table the vertical mode variation under 32, 40 psi inflation levels for a range of speeds and confirms the conclusions summarized above.

Figure 6:
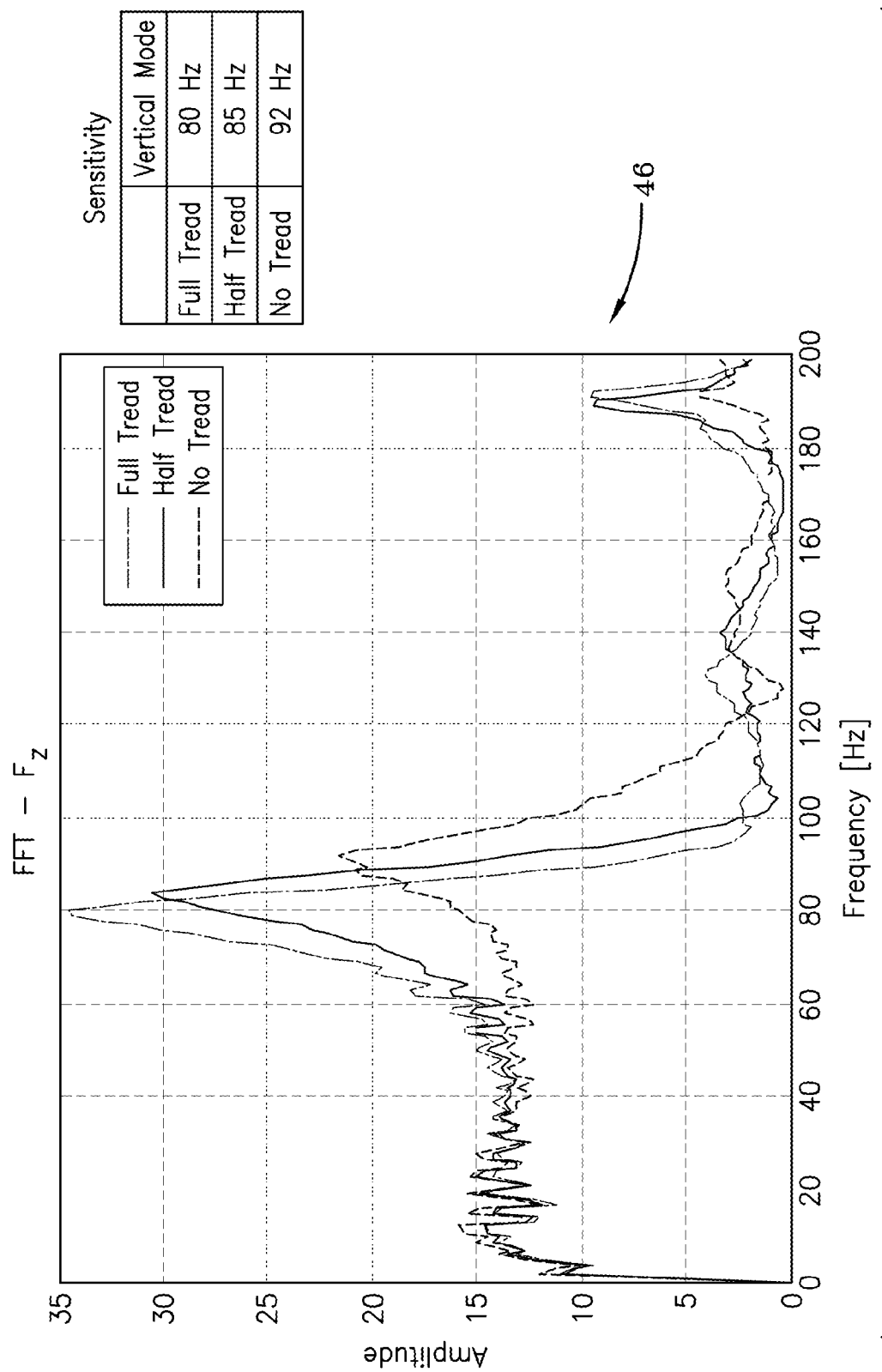
FIG. 6 is a comparison graph of vertical mode frequency vs. amplitude for full, half and no tread conditions and showing sensitivity of the vertical mode in tabular form.

In FIG. 6, the dependency of the vertical mode frequency FFT-Fz is graphically shown in graph 46 for a tire at full tread, half tread and no tread. As seen by the differing vertical mode computations in the table, tire wear state dependencies create the highest vertical mode divergencies. The relatively high tire wear state dependencies provide the verification and basis for the development of a tire wear state estimation algorithm pursuant to the invention.

Figure 7A:
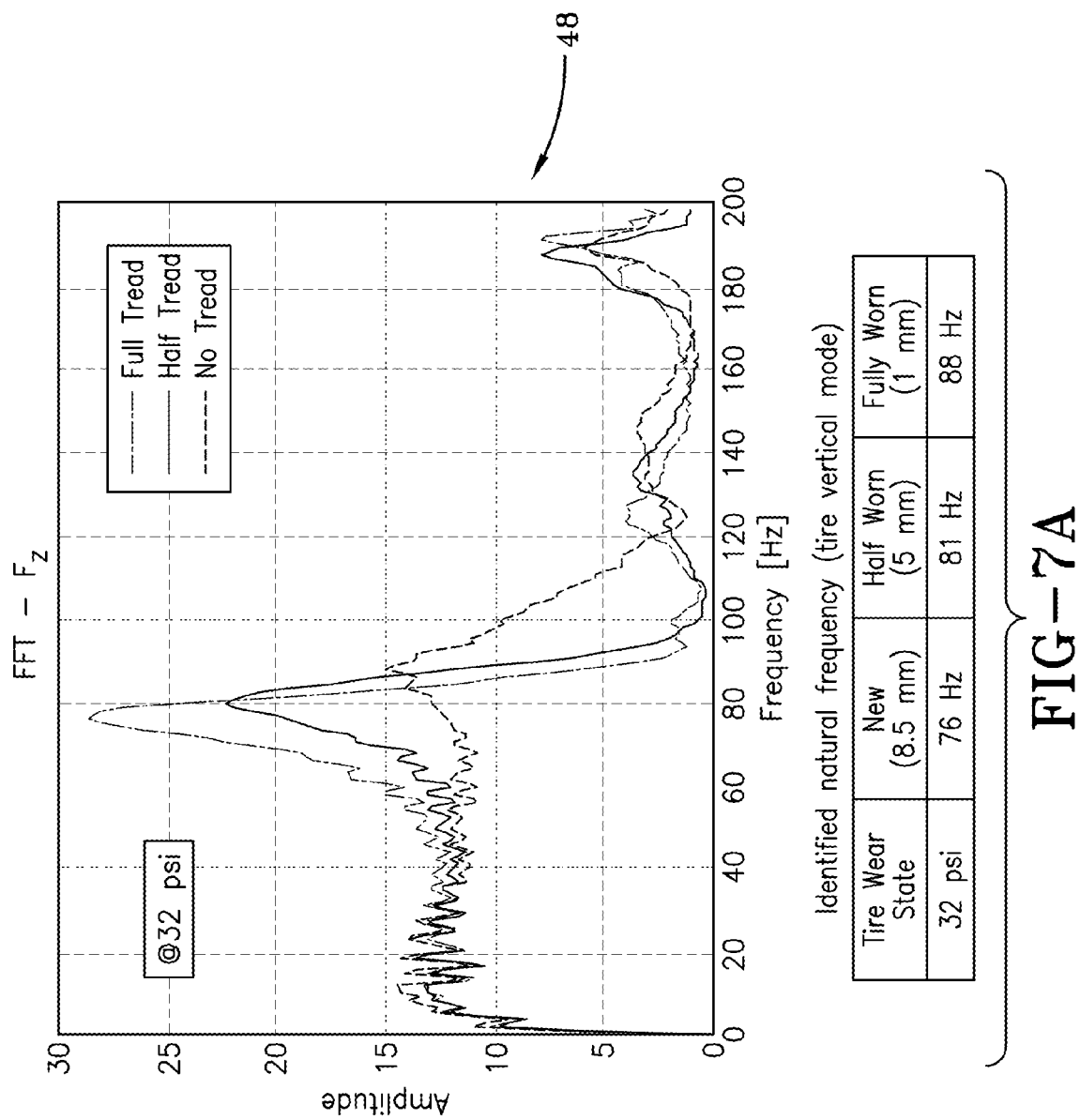
FIG. 7A is a graph similar to FIG. 6 at a tire inflation of 32 psi and showing in table form the identified tire vertical mode frequency for the three tire wear states.
Figure 7B:
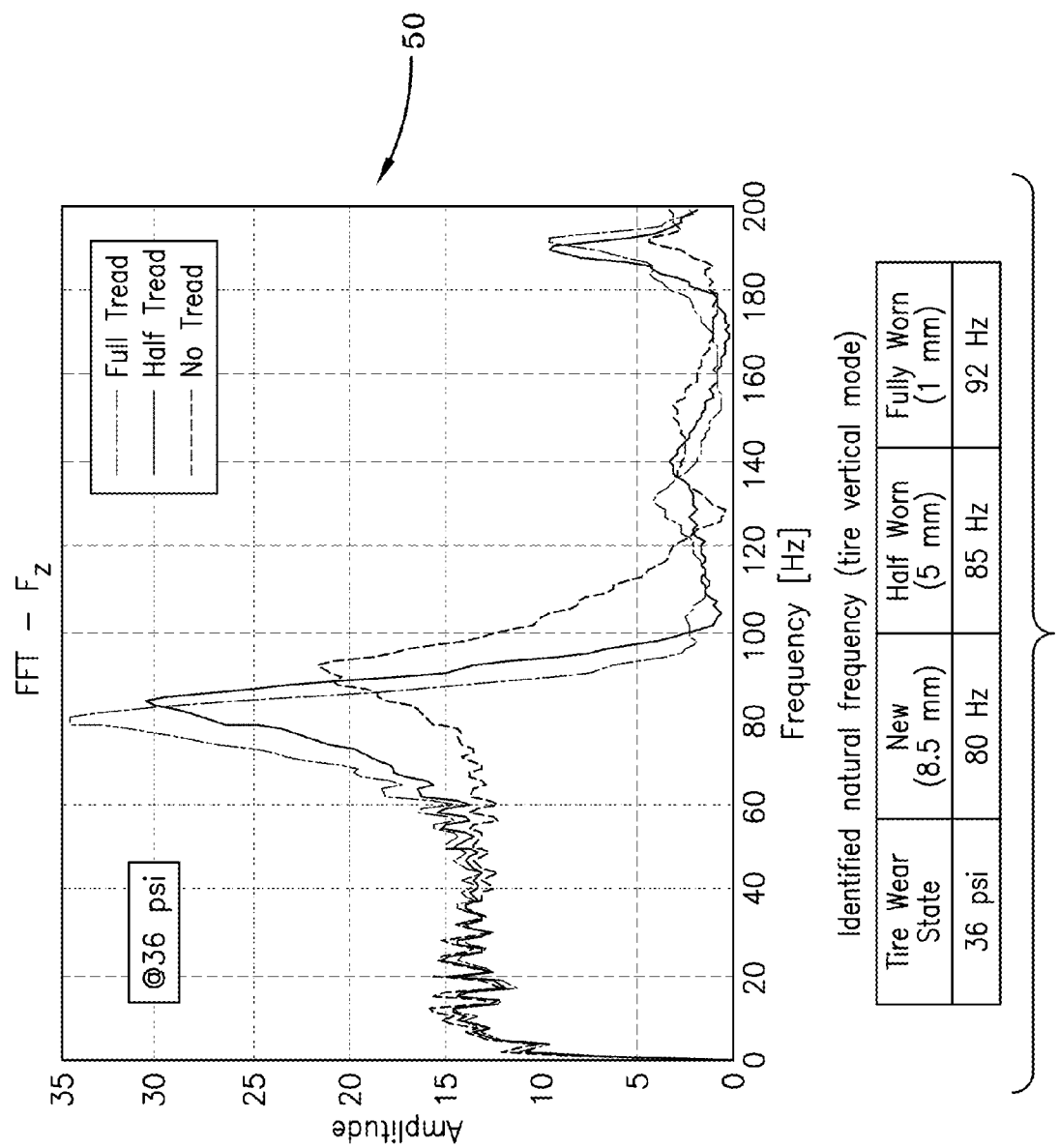
FIG. 7B is a graph and table similar to FIG. 7A for a tire inflated to 36 psi.
Figure 7C:
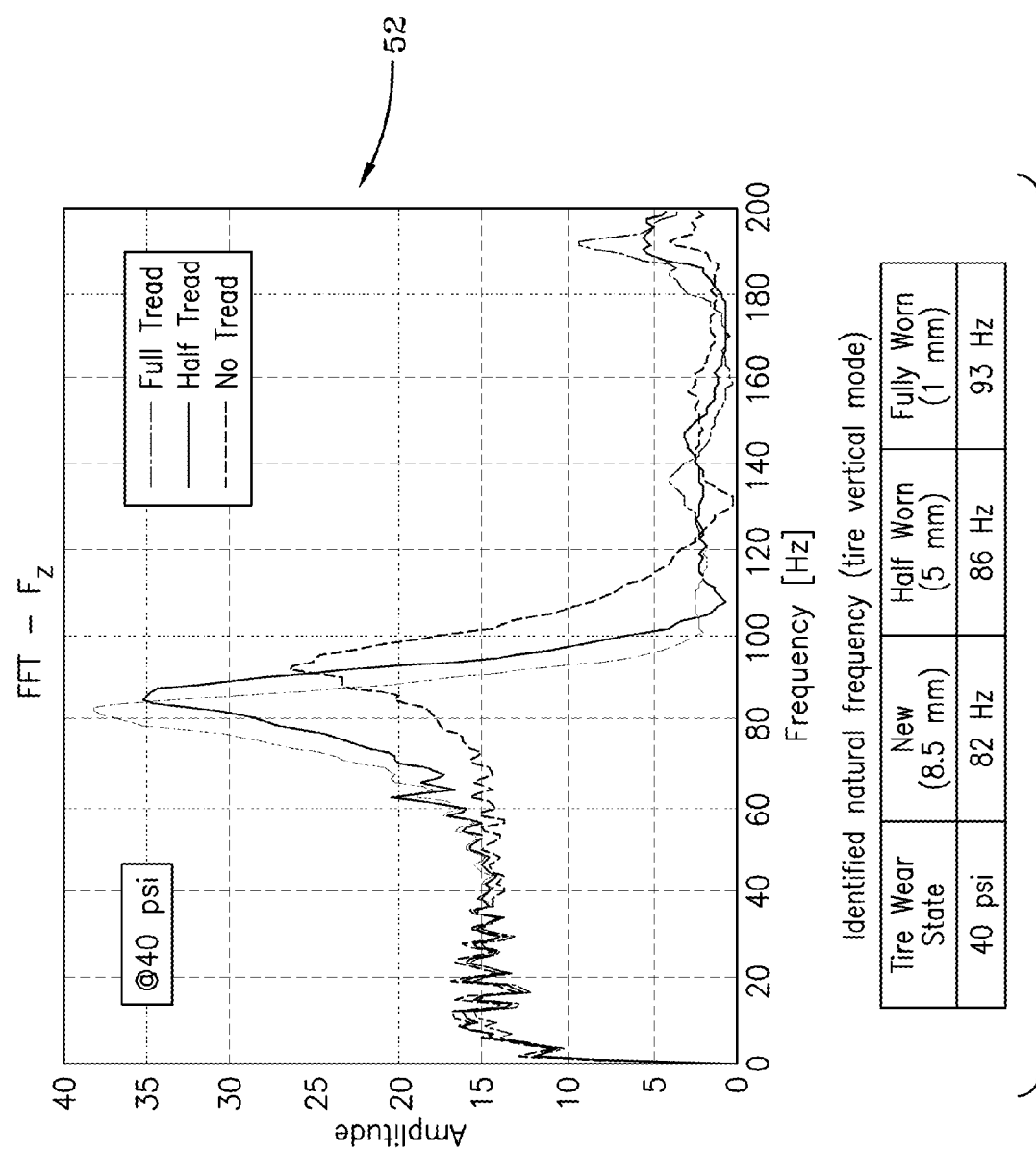
FIG. 7C is a graph and table similar to FIG. 7A for a tire inflated to 40 psi.

Graphs 48, 50, 52 of FIGS. 7A through C, respectively, show test results indicative of tread wear state dependencies for a test tire at respective inflation levels of 32, 36, and 40 psi. The graphs and their tabular summaries indicate that the trends (tread wear dependencies) are consistent across all inflation pressure conditions.

Figure 8:
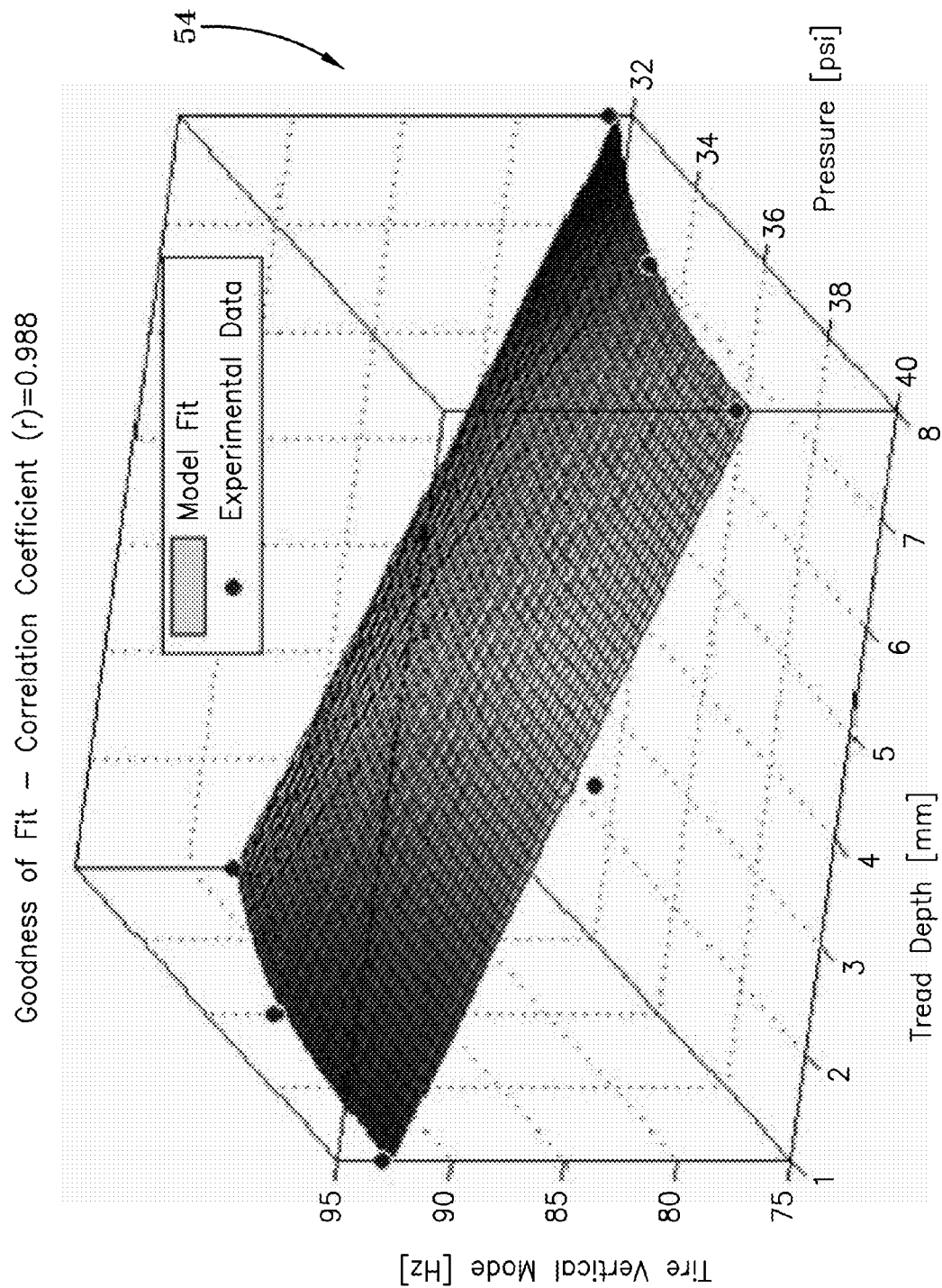
FIG. 8 is a three dimensional graph showing the "goodness" of model fit, showing tire vertical mode frequency vs. tread depth and pressure.

In FIG. 8, the goodness of fit of the tread wear estimation model is shown by graph 54. The model fit is compared against experimental data and with the fit yielding a correlation coefficient (r)=0.988. Validation of the model is thus indicated. A polynomial model (second-order in pressure and first-order in tread depth) were found to give a good fit.

Figure 9:
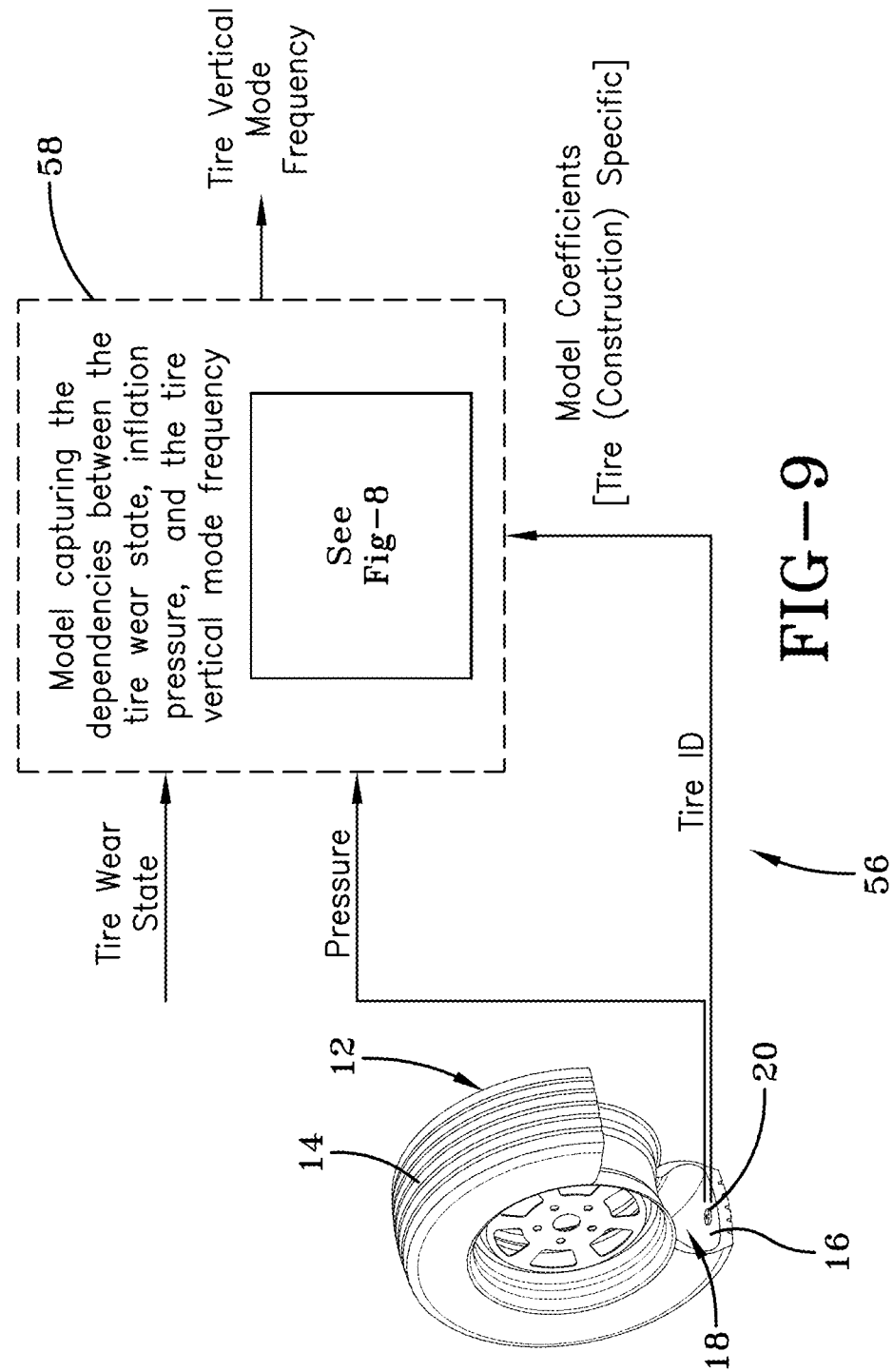
FIG. 9 is a block diagram of the tire wear state system.

Referring to FIG. 9, a tire-based flow chart model implementation is shown. The tire wear state is derived from a model 58 capturing the dependencies between the tire wear state, inflation pressure and the tire vertical mode frequency. Inflation pressure of the tire 12 and tire ID information 56 is obtained from the TPMS module 20 mounted to the tire. The Model Coefficients are tire-construction specific and are ascertained by the tire identification obtained from TPMS stored data. For a given tire construction, a recursive least squares (RLS) estimate of the tire wear state can be made using the tire inflation pressure, tire ID (to use the correct model coefficients) and the tire vertical mode frequency information. The sensors and data stored within TPMS module 20 is used to obtain pressure and tire ID information. The measurement of tire vertical mode on the vehicle is derived from either a wheel-mounted accelerometer or a tire crown-mounted accelerometer by using a spectral analysis methods.

The RLS Estimation Algorithm (with forgetting factor) provides a method to iteratively update the unknown parameter at each sampling time to minimize the sum of the squares of the modeling error using the past data contained within the regression vector. The following is the model capturing the dependency between the tire wear state, inflation pressure and the tire vertical mode frequency:

Fitting Model

Tire Vertical Mode Frequency=$p00+p10$*pressure+
$p01$*tread depth+$p20$*pressure^2+
$p11$*pressure*tread depth Model Coefficients (with 95 percent confidence bounds):
p00=−35.94 (−171.6, 99.72)
p10=6.586 (−0.9712, 14.14)
p01=−2.31 (−5.37, 0.7512)
p20=−0.08333 (−0.1881, 0.02144)
p11=0.01786 (−0.06682, 0.1025)

The above equation can be rewritten into a standard parameter identification form as follows:

$$y=\psi^\tau\theta$$

Where:

$$y=(\text{Tire Vertical Mode Frequency}-p00-p10*\text{pressure}-p20*\text{pressure}^2)/(p11*\text{pressure}+p01)$$

$$\psi=1$$

θ=Tread depth (unknown—to be estimated)

The procedure for solving the RLS problem is as follows:
Step 0: Initialize the unknown parameter θ(0) and the covariance matrix P(0); set the forgetting factor λ.
Step 1: Measure the system output y(t) and compute the regression vector φ(t).
Step 2: Calculate the identification error e(t):

$$e(t)=y(t)-\phi^T(t)\cdot\theta(t-1)$$

Step 3: Calculate the gain k(t):

$$k(t)=P(t-1)\phi(t)[\lambda+\phi^T(t)P(t-1)\phi(t)]^{-1}$$

Step 4: Calculate the covariance matrix:

$$P(t)=(1-k(t)\phi^T(t)\lambda^{-1}P(t-1)$$

Step 5: Update the unknown parameter:

$$\theta(t)=\theta(t-1)+k(t)e(t)$$

Step 6: Repeat Steps 1 through 5 for each time step.
Where y is the output; ψ is the regression vector; and θ is the unknown parameter. The inputs of regression vector and output are used respectively as input and output in the Recursive Least Squares (with forgetting factor) Parameter Estimation Algorithm to solve for the unknown parameter of the tire tread depth.

Figure 10A:
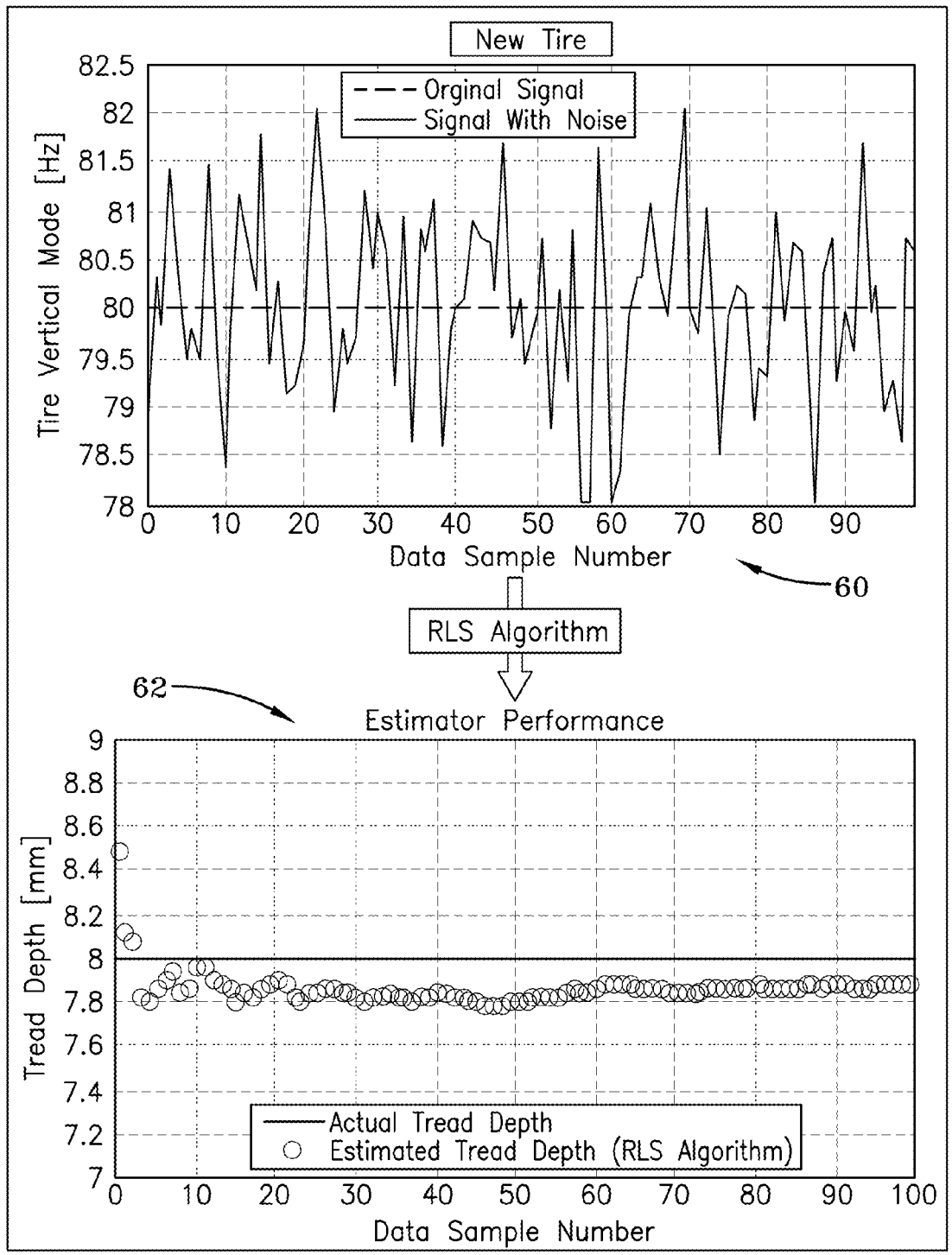
FIG. 10A are graphs showing estimator performance for a new tire at a speed of 60 mph and inflation pressure of 36 psi.
Figure 10B:
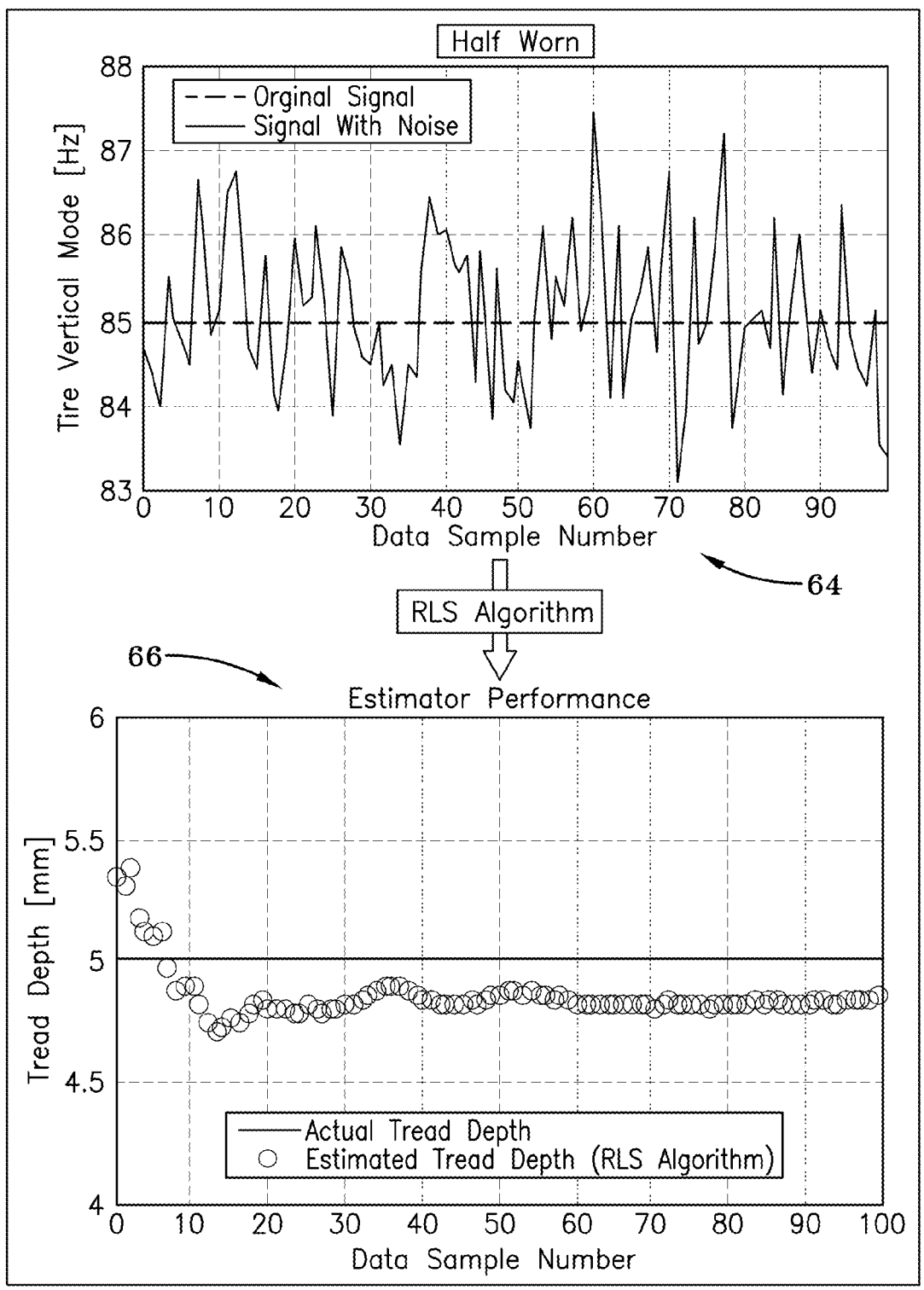
FIG. 10B are graphs showing estimator performance for a half-worn tire.
Figure 10C:
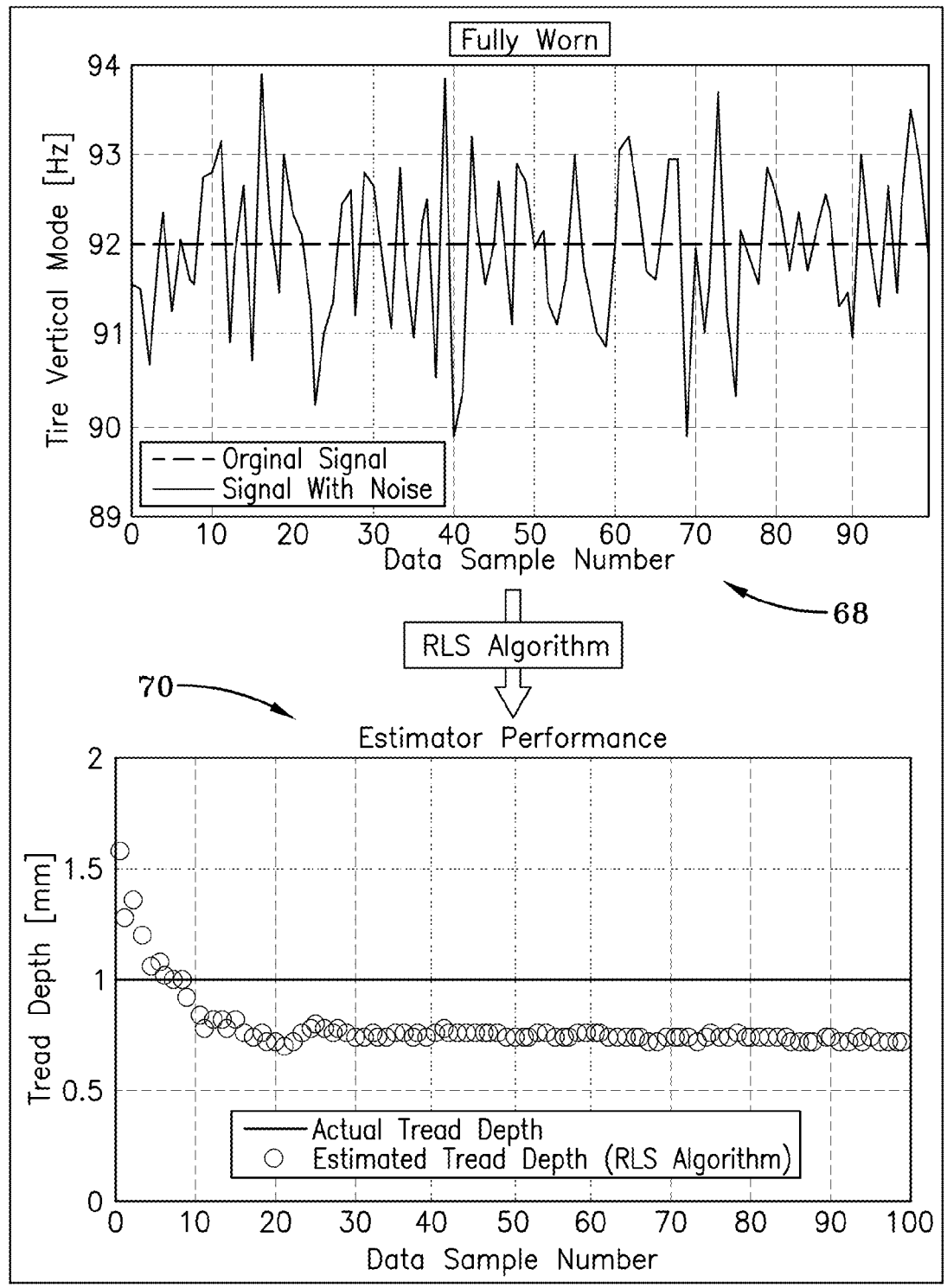
FIG. 10C are the graphs showing estimator performance for a fully worn tire.
Figure 11:
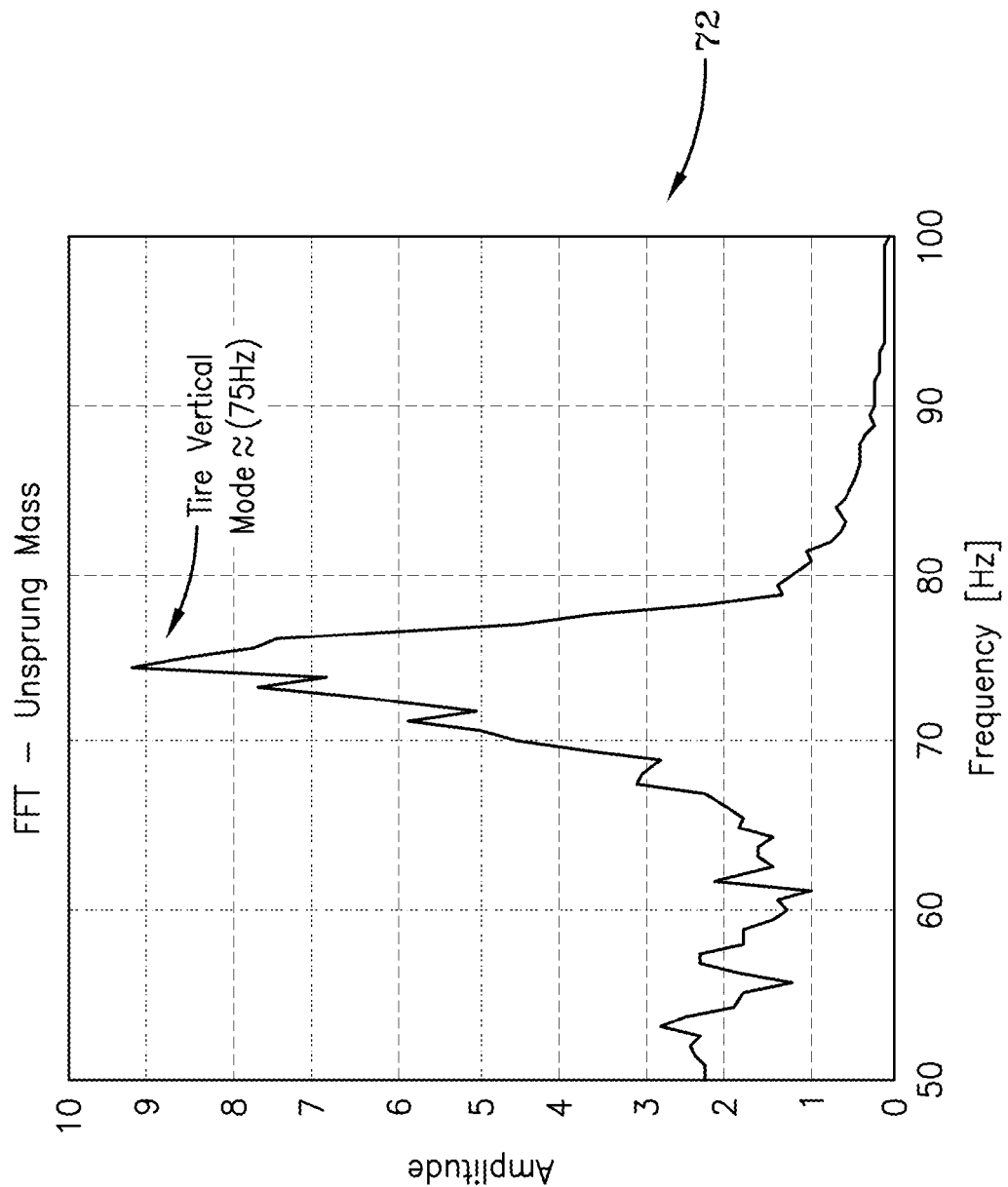
FIG. 11 is a graph showing successful extraction of the tire vertical mode from the vertical accelerations signal of a hub mounted accelerometer.

Referring to FIGS. 10A through C, estimation performance using the recursive least squares (RLS) estimation algorithm (with forgetting factor) is shown graphically by tire vertical mode [Hz] and corresponding tread depth (estimation) graphs. FIG. 10A graphs 60, 62 are for a new tire; FIG. 10B graphs 64, 66 for a half-worn tire; and FIG. 10C graphs 68, 70 for a fully worn tire. The tests were conducted at a tire speed of 60 kph and inflation pressure of 36 psi. As will be seen, the estimates resulting from use of the RLS algorithm are accurate.

Figure 12:
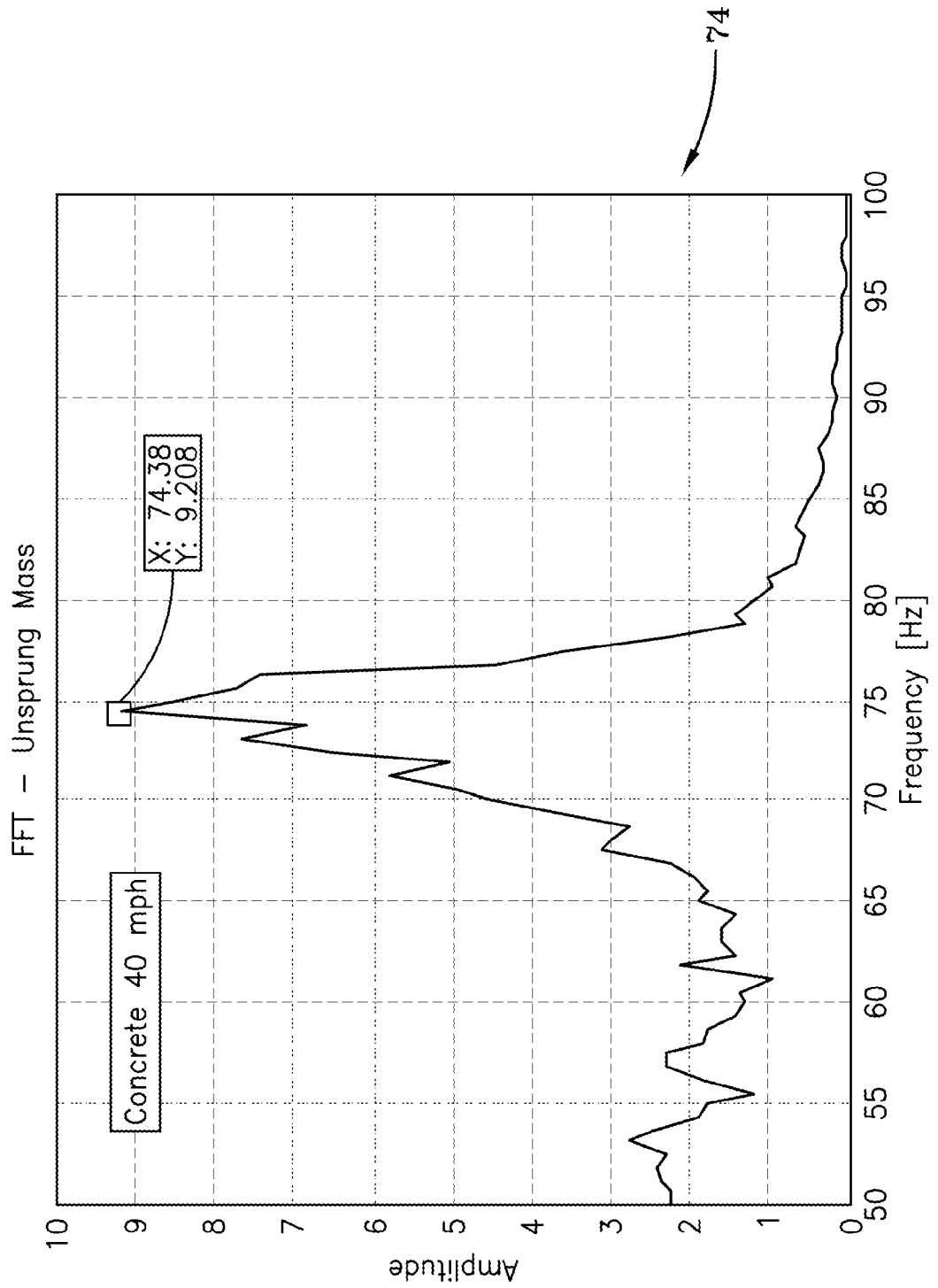
FIG. 12 is a surface effect graph of FFT for Unsprung Mass condition on concrete at 40 mph.

The subject method for tire wear estimation may utilize either an on-vehicle measurement of the tire vertical mode or an in-tire measurement of the tire vertical mode, or both for the purpose of cross-validation. For on-vehicle measurement, the vertical mode is extracted from the vertical acceleration signal of a hub-mounted accelerometer. Hub-mounted accelerometers are commercially available and are used as part of vehicle suspension management systems. From tests conducted on various surfaces, it was found that the tire vertical mode was successfully detected under all the test conditions. For example, graph 74 of FIG. 12 shows the vertical mode from an accelerometer measurement conducted on a tire travelling on concrete at 40 mph. The amplitude of 9.208 and frequency [Hz] 74.38 were measured. Similar testing was conducted on an impact strip at a travel speed of 25 mph and a pothole at 10 mph. The test results all verified the extracting vertical mode from a hub-mounted accelerometer for the purpose of tread wear estimation pursuant to the subject methodology.

Figure 13:
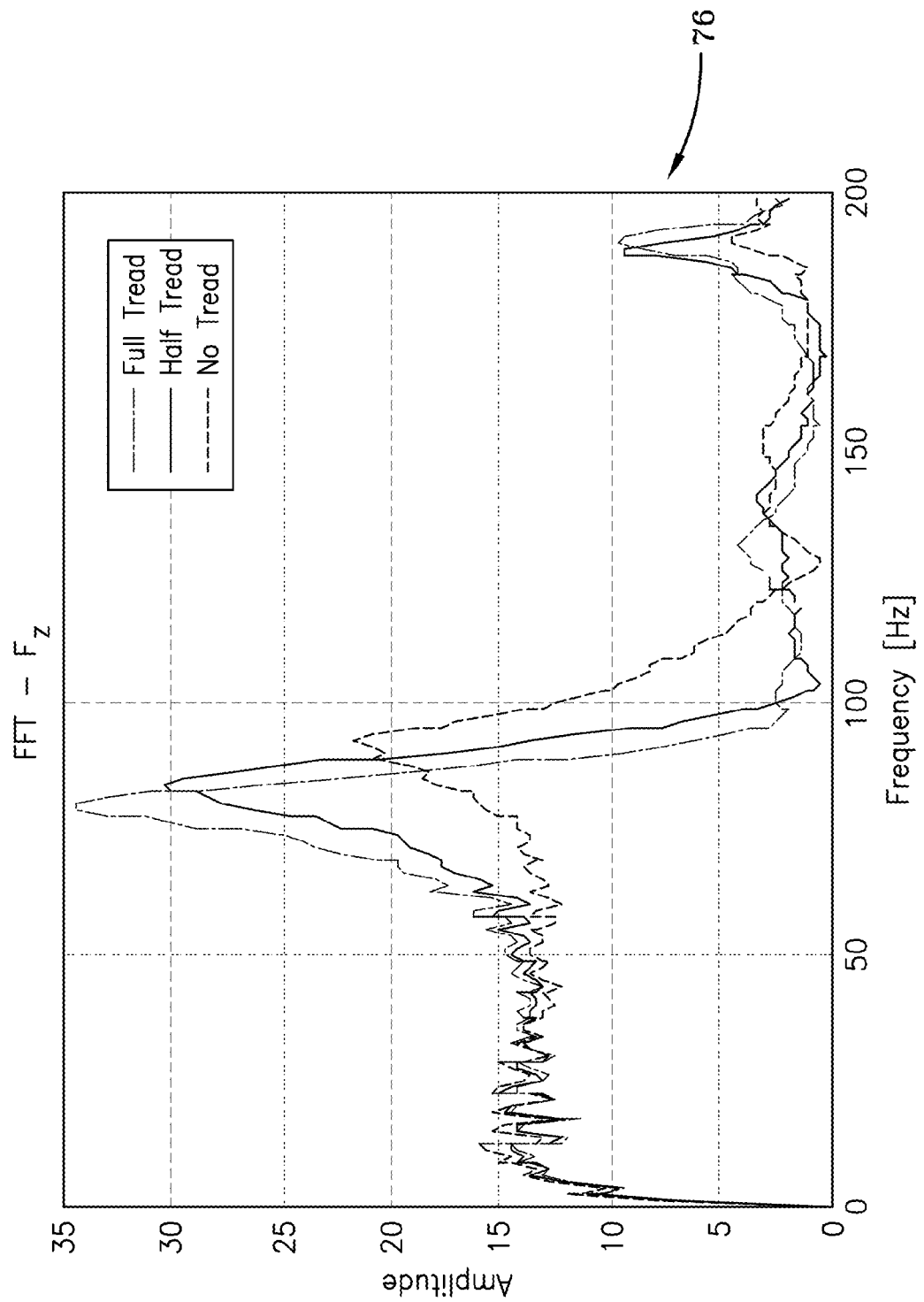
FIG. 13 is a comparative graph of FFT-Fz showing amplitude vs. frequency for full tread, half tread and no tread conditions.
Figure 14:
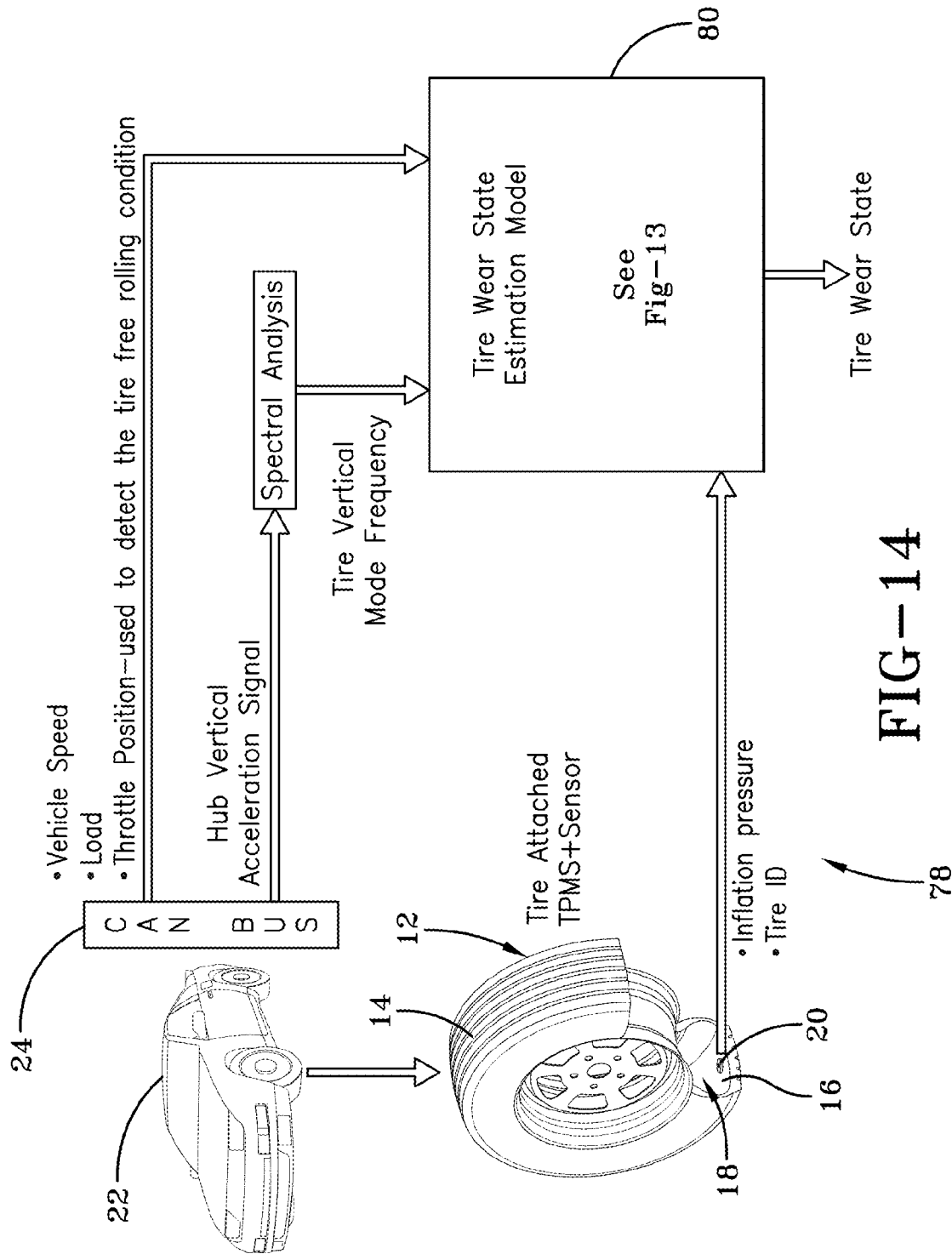
FIG. 14 is a block level diagram of the tire wear system using On Vehicle Algorithm Implementation and Vehicle Measurement of the Tire Vertical Mode.

FIG. 14 shows in block level diagram the on-vehicle algorithm implementation using vehicle measurement of the tire vertical mode. The vehicle 22 provides by CAN bus vehicle speed, load and throttle position used to detect the tire free rolling condition to a tire wear state estimation model 80, represented graphically in FIG. 13. Also obtained from the vehicle is the hub vertical acceleration signal from which through spectral analysis the tire vertical mode frequency is obtained. The tire vertical mode frequency is likewise input into the tire wear state estimation model 80. From the tire 12, inflation pressure and tire ID data is obtained from the TPMS module 20 and input into the tire wear state estimation model. FIG. 13 shows the model for full tread, half-tread, and no tread results in graph 76.

Figure 15:
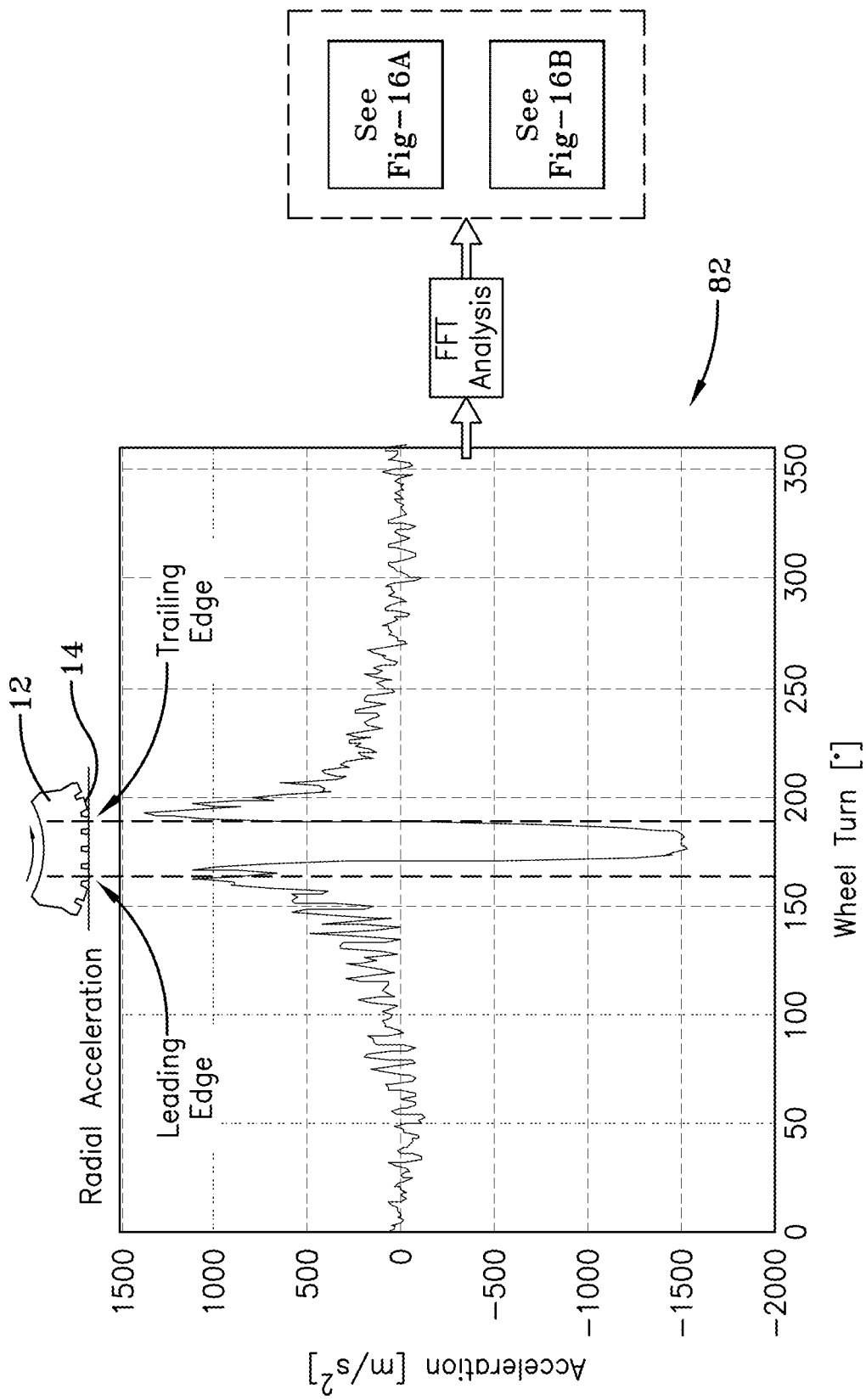
FIG. 15 is a graph showing a second approach to tire vertical mode determination, using the vertical acceleration signal of a crown mounted accelerometer.
Figure 16A:
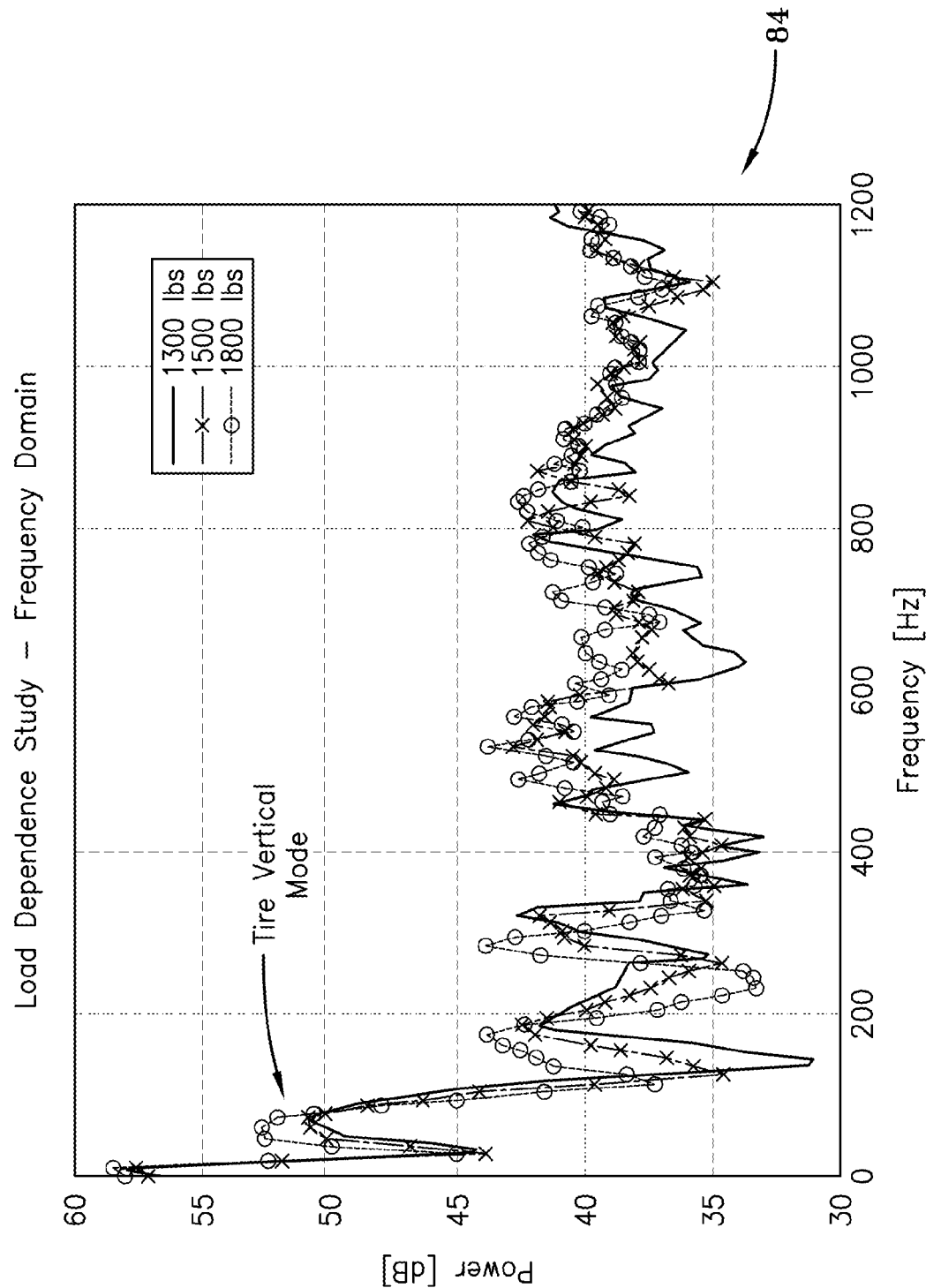
FIG. 16A is a graph showing the results of a load dependence study in the frequency domain showing the tire vertical mode for three load levels in power [db] vs. frequency.
Figure 16B:
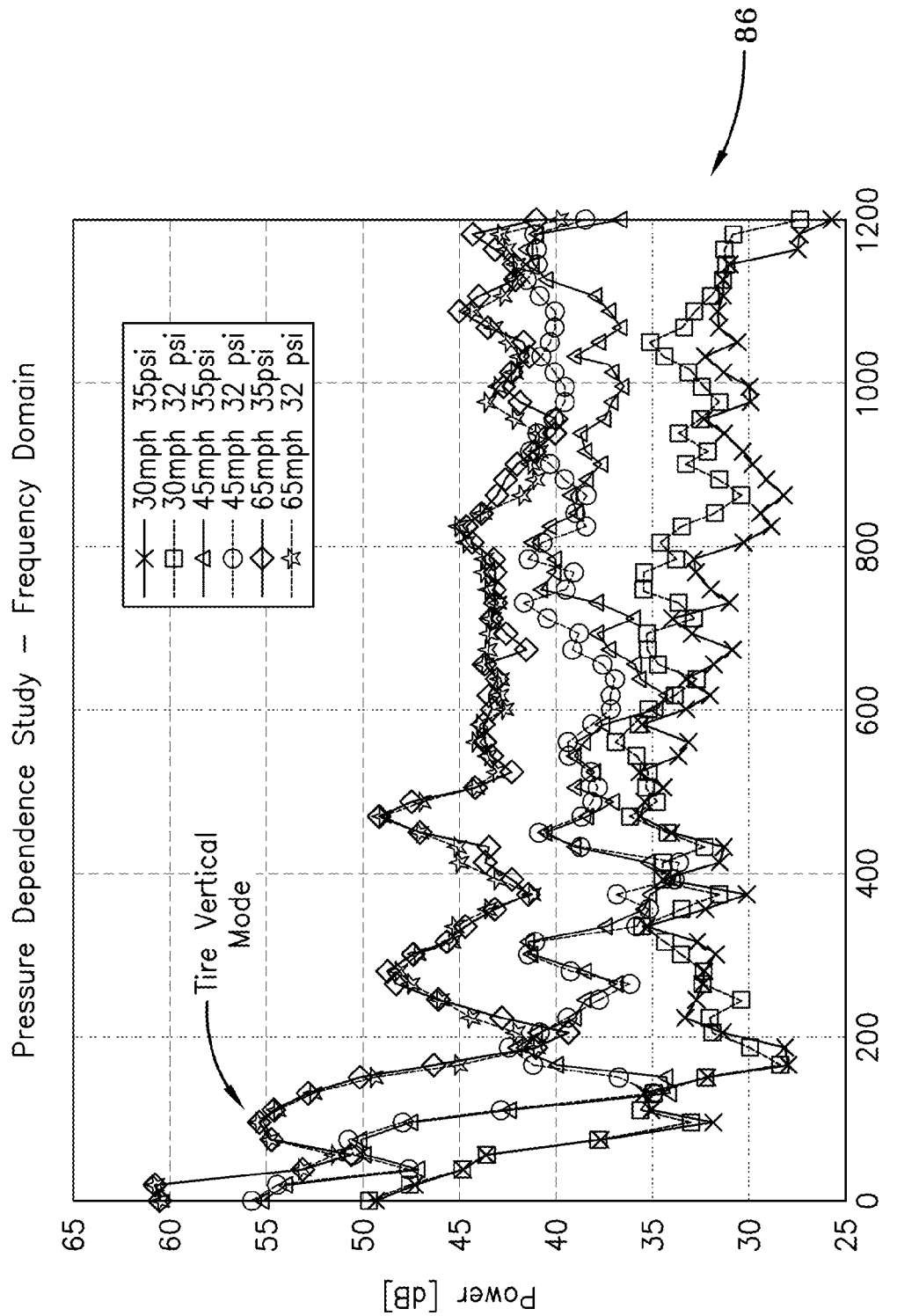
FIG. 16B is a graph showing the results of a pressure dependence Study in the Frequency Domain for a tire travelling at 30, 45, 65 mph and at inflation levels of 32 and 35 psi.

A second approach to measurement of the tire vertical mode envisions an in-tire measurement. An accelerometer is mounted in the crown region (tread 14) of the tire 12. From the sensor, a vertical acceleration signal is obtained as represented by graph 82 of FIG. 15, the leading and trailing edges of which being identified. From the vertical acceleration signal, the tire vertical mode is extracted using FFT analysis technique common in the field of signal processing. Load dependence and pressure dependence studies in the frequency domain are shown graphically in FIGS. 16A and 16B by graphs 84, 86, respectively. In FIG. 16A, the tire vertical mode is identified for loading of 1300, 1500 and 1800 pounds. In FIG. 16B, pressure dependence results summarized in graph 86 are form speeds of 30, 45 and 65 mph and inflation pressures of 32 and 35 psi. The results verify the efficacy of using a tire-based accelerometer sensor to identify the tire vertical mode.

Figure 17:
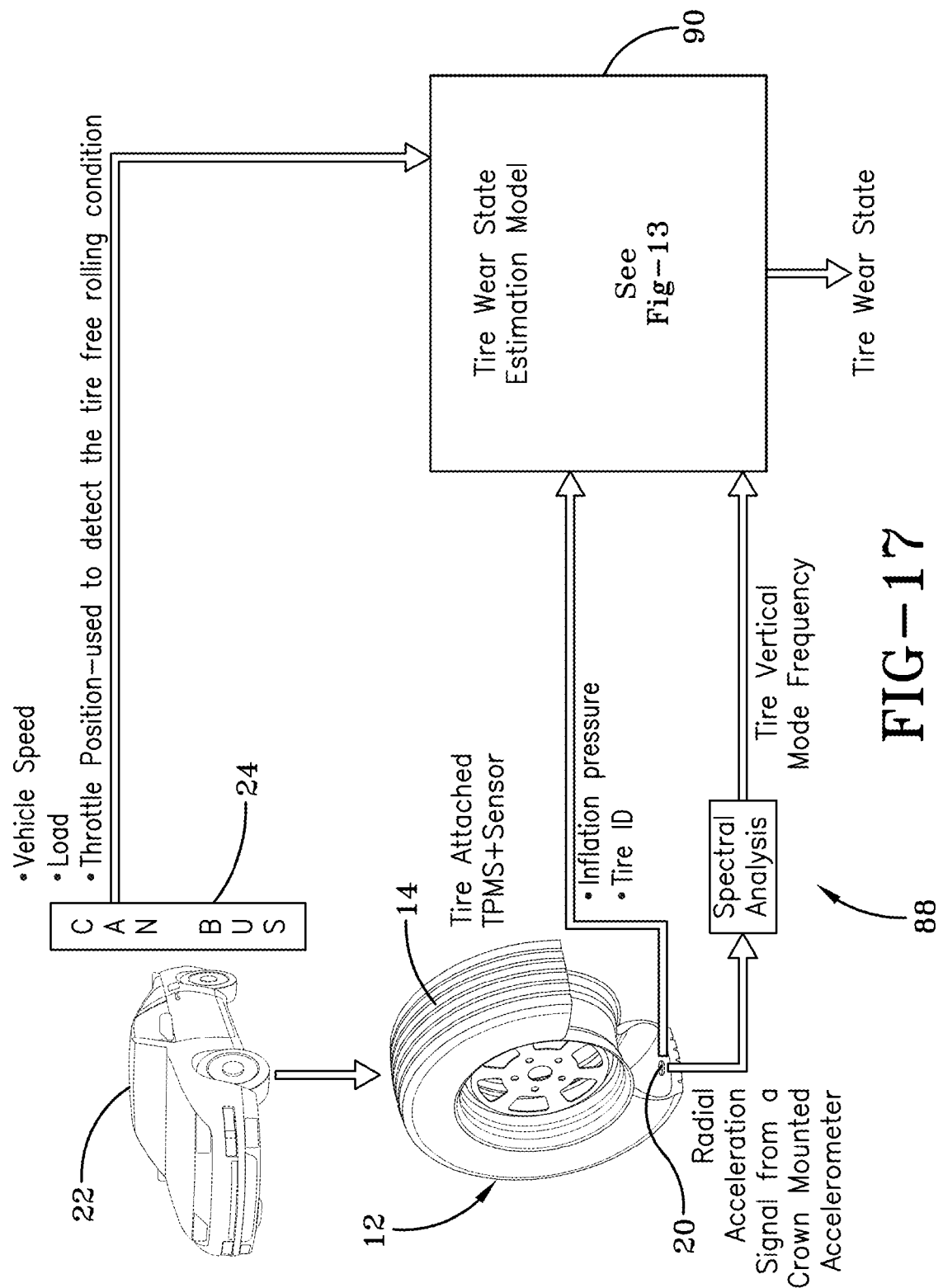
FIG. 17 is a block level diagram of On Vehicle Algorithm Implementation using In-tire Measurement of the Tire Vehicle Mode.

In FIG. 17, on-vehicle algorithm implementation system for in-tire measurement of the tire vertical mode is shown in block diagram. The vehicle 22 provides by CAN bus 24 the vehicle speed, load and throttle position as input into the tire wear state estimation model shown graphically in FIG. 13. From the tire 12, the TPMS (including an accelerometer) module 20 provides inflation pressure, tire ID data and a radial acceleration signal from a crown mounted accelerometer. From a spectral analysis of the radial acceleration signal, as explained above, the tire vertical mode frequency is obtained and input to the tire wear state estimation model (FIG. 13). An estimated tire wear state can thus be obtained.

Figure 18A:
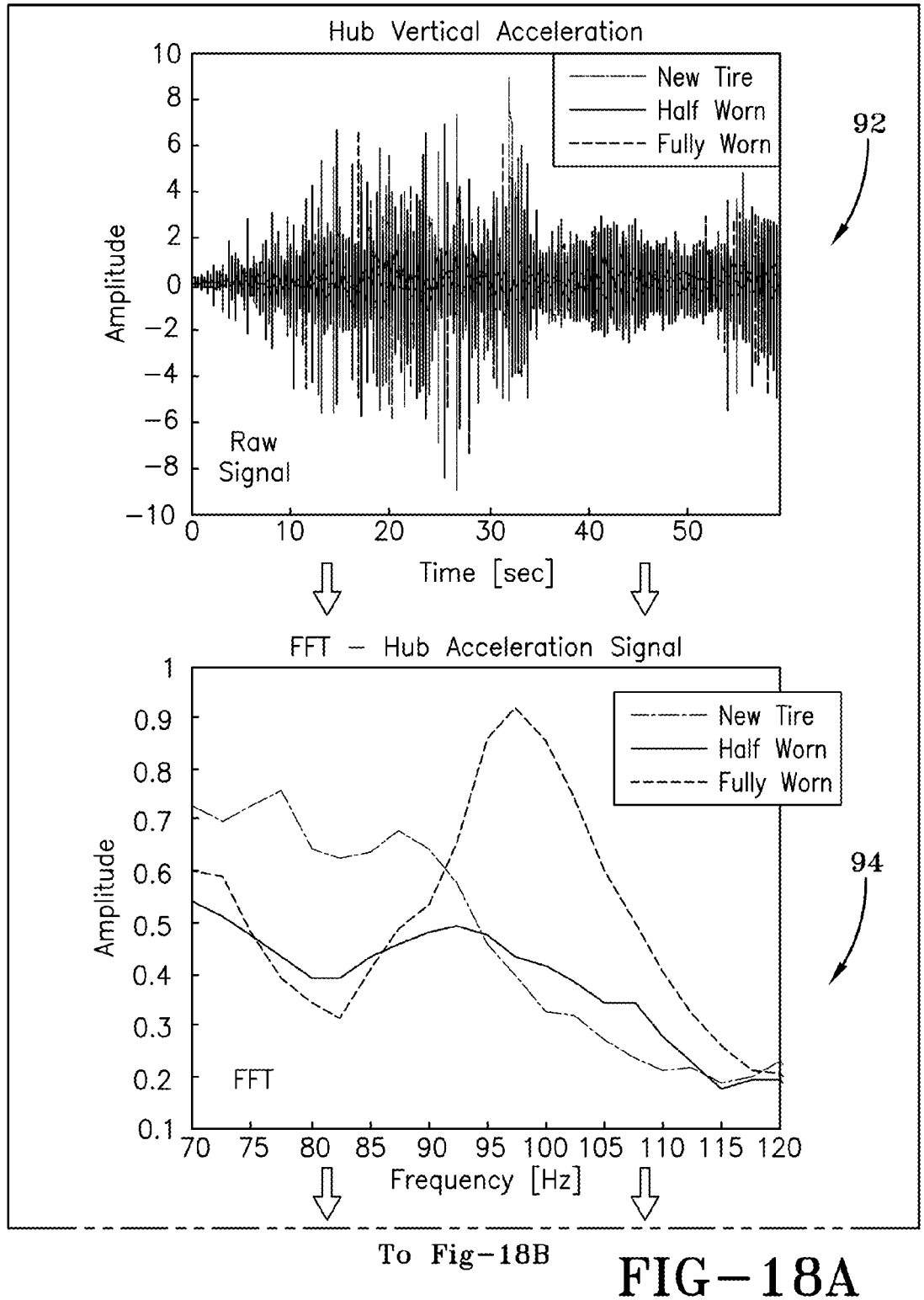
FIG. 18A shows graphs indicating the raw signal of hub vertical acceleration for a new, half worn and fully worn tire and the FFT Hub Acceleration signal in the frequency domain.
Figure 18B:
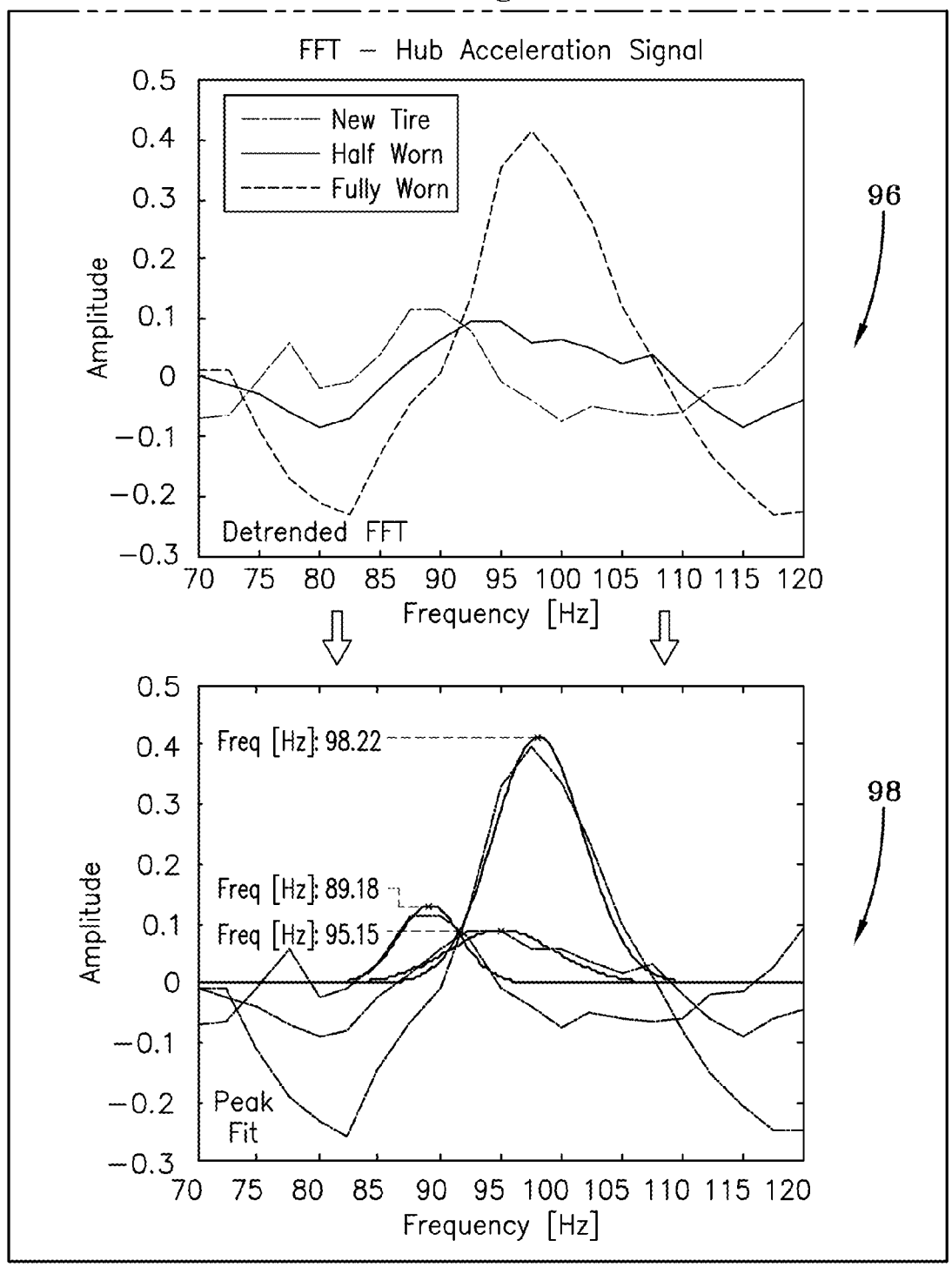
FIG. 18B are graphs showing the detrended FFT Hub Acceleration Signal for a new, half worn and fully worn tire and the peak fit graph of the acceleration signal graph.

FIG. 18A shows graphs 92, 94 depicting raw hub vertical acceleration signals for new, half worn and fully worn tires and the hub acceleration signal for the three tire conditions. FIG. 18B shows the detrended (corrected) hub acceleration signal 96 for the three tire conditions and peak fit hub acceleration signals 98 for the three tire conditions derived therefrom. The peak fit approach indicates a close fit between the graphs in all tire conditions.

From the foregoing, it will be appreciated the subject tread wear estimation system utilizes a novel algorithm to estimate the tire wear state. Tire wear state is recursively estimated by using a RLS algorithm formulated based on a polynomial model which captures the dependencies between the tire wear state, inflation pressure and the tire vertical mode frequency. The model inputs for the RLS algorithm include: tire inflation pressure, tire ID (required for using the correct tire specific model coefficients) and the tire vertical mode frequency. The tire inflation pressure and tire ID information is available from a tire attached TPMS module. Information about the tire vertical mode frequency can be obtained by using one of the following methods:

Approach 1: Using on-vehicle measurement of the tire vertical mode, i.e. extract the tire vertical mode frequency from the vertical acceleration signal of a hub (wheel) mounted accelerometer.

Approach 2: In-tire measure of the tire vertical mode, i.e. extract the tire vertical mode frequency from the vertical acceleration signal of a crown mounted accelerometer.

Both approaches may be employed for cross-validation of results. The application of the real-time RLS algorithm in achieving the desired tread wear estimation and accurate estimation results were experimentally validated.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
    at least one tire supporting a vehicle;
    tire pressure measuring means affixed to the one tire for measuring tire inflation pressure and generating tire inflation pressure data;
    tire vertical mode measuring means for measuring tire vertical mode frequency and generating tire vertical mode frequency data;
    tire identification means for generating tire-specific frequency mode coefficients using tire-specific identification data; and
    tire wear estimation means for calculating an estimation of a tire wear state based upon the tire inflation pressure data, the vertical mode frequency data, and the tire-specific frequency mode coefficients; and
    wherein the tire wear estimation means comprises a correlation model between the tire wear state and the tire vertical mode frequency.

2. The tire wear state estimation system of claim 1, wherein the tire pressure measuring means comprises a tire-mounted pressure measuring device operative to measure a tire cavity pressure and transmit the tire inflation pressure data from the tire cavity pressure measurement.

3. The tire wear state estimation system of claim 2, wherein the tire identification means comprises tire-specific identification data stored within and accessible from the tire-mounted pressure measuring device.

4. The tire wear state estimation system of claim 3, wherein the tire-specific frequency mode coefficients are generated by the tire identification means using on-vehicle or in-tire measurement of a tire vertical mode frequency.

5. The tire wear state estimation system of claim 4, wherein the measurement of the tire vertical mode frequency is from a wheel-mounted accelerometer or a tire crown-mounted accelerometer.

6. The tire wear state estimation system of claim 4, wherein the tire wear estimation means comprises a correlation model between the tire wear state and the tire vertical mode frequency.

7. The tire wear state estimation system of claim 6, wherein the correlation model comprises a recursive least squares algorithm based on a polynomial model capturing a dependency between a wear state of the tire, the tire inflation pressure data, and the tire vertical mode frequency.

8. The tire wear state estimation system of claim 1, wherein the correlation model comprises a recursive least squares algorithm based on a polynomial model capturing a dependency between the tire wear state, the tire inflation pressure data, and the tire vertical mode frequency.

9. A tire wear state estimation system comprising: at least one tire supporting a vehicle;
    a tire-mounted pressure measuring device affixed to the one tire operative to measure a tire cavity pressure and transmit tire inflation pressure data from the tire cavity pressure measurement;
    tire-specific identification data stored within and accessible from the tire-mounted pressure measuring device;
    tire vertical mode measuring means for measuring tire vertical mode frequency and generating tire vertical mode frequency data;
    tire identification means for generating tire-specific frequency mode coefficients using the tire-specific identification data and on-vehicle or in-tire measurement of a tire vertical mode frequency; and
    tire wear estimation means for calculating an estimation of a tire wear state based upon the tire inflation pressure data, the tire vertical mode frequency data, and the tire-specific frequency mode coefficients; and
    wherein the tire wear estimation means comprises a correlation model between the tire wear state and the tire vertical mode frequency.

10. The tire wear state estimation system of claim 9, wherein the measurement of the tire vertical mode frequency is from a wheel-mounted accelerometer or a tire crown-mounted accelerometer.

11. The tire wear state estimation system of claim 9, wherein the correlation model comprises a recursive least squares algorithm based on a polynomial model capturing a dependency between a wear state of the tire, the tire inflation pressure data, and the tire vertical mode frequency.

12. A method of tire wear state estimation comprising:
    affixing a tire pressure measuring device to a vehicle-supporting tire, the pressure measuring device measuring a tire cavity inflation pressure and generating tire inflation pressure data;
    measuring tire vertical mode frequency and generating tire vertical mode frequency data;
    generating tire-specific frequency mode coefficients using tire-specific identification data; and
    calculating an estimation of a tire wear state based upon the tire inflation pressure data, the vertical mode frequency data, and the tire-specific frequency mode coefficients employing a correlation model between the tire wear state and the tire vertical mode frequency.

13. The method of claim 12, wherein further comprising generating the tire-specific frequency mode coefficients using on-vehicle or in-tire measurement of a tire vertical mode frequency.

14. The method of claim 13, wherein further comprising measuring the tire vertical mode frequency from a wheel-mounted accelerometer or a tire crown-mounted accelerometer.

15. The method of claim 12, wherein further comprising configuring the correlation model to comprise a recursive least squares algorithm based on a polynomial model capturing a dependency between the tire wear state, the tire inflation pressure data, and the tire vertical mode frequency.

* * * * *